(12) United States Patent
Zhang et al.

(10) Patent No.: US 12,445,397 B2
(45) Date of Patent: Oct. 14, 2025

(54) COMMUNICATION METHOD AND APPARATUS BASED ON AVATAR INTERACTION INTERFACE, AND COMPUTER DEVICE

(71) Applicant: Tencent Technology (Shenzhen) Company Limited, Guangdong (CN)

(72) Inventors: Xiaolong Zhang, Shenzhen (CN); Xiaorui Huang, Shenzhen (CN); Yuan Fang, Shenzhen (CN); Bing Li, Shenzhen (CN); Jianqiu Zheng, Shenzhen (CN); Huai Zhang, Shenzhen (CN); Min Tan, Shenzhen (CN); Yuteng Zhong, Shenzhen (CN); Yuan Lai, Shenzhen (CN); Xuan Ye, Shenzhen (CN); Ye Zhang, Shenzhen (CN); Kui Huang, Shenzhen (CN); Ziqiang Peng, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 17/949,637

(22) Filed: Sep. 21, 2022

(65) Prior Publication Data

US 2023/0015940 A1 Jan. 19, 2023

Related U.S. Application Data

(63) Continuation of application No. PCT/CN2021/100047, filed on Jun. 15, 2021.

(30) Foreign Application Priority Data

Jul. 24, 2020 (CN) .......................... 202010723529.1

(51) Int. Cl.
*H04L 51/04* (2022.01)
*G06F 3/0482* (2013.01)
*H04L 51/02* (2022.01)

(52) U.S. Cl.
CPC ............ *H04L 51/04* (2013.01); *G06F 3/0482* (2013.01); *H04L 51/02* (2013.01)

(58) Field of Classification Search
CPC ....... H04L 51/04; H04L 51/02; G06F 3/0482; A63F 13/87
See application file for complete search history.

(56) References Cited

U.S. PATENT DOCUMENTS 6,699,125 B2 * 3/2004 Kirmse .................. H04L 51/04
463/42
10,786,744 B1 * 9/2020 George .................. A63F 13/35
(Continued)

FOREIGN PATENT DOCUMENTS

CN 103154982 A 6/2013
CN 103297544 A 9/2013
(Continued)

OTHER PUBLICATIONS

International Search Report and Written Opinion for priority application No. PCT/CN2021/100047 dated Sep. 23, 2021, 9p, in Chinese language.
(Continued)

*Primary Examiner* — John A Follansbee
*Assistant Examiner* — Zonghua Du
(74) *Attorney, Agent, or Firm* — Crowell & Moring LLP

(57) ABSTRACT

This application relates to a communication method based on a virtual role interaction interface, including: displaying a virtual role interaction interface of a virtual role interaction application, the virtual role interaction interface including a target virtual role identifier; displaying an instant session
(Continued)

message triggering control on the virtual role interaction interface in response to a trigger operation on the target virtual role identifier; displaying a message input interface in response to a trigger operation on the instant session message triggering control; and transmitting, to an instant messaging user account corresponding to the target virtual role identifier after a session message is inputted in the message input interface, the session message used for displaying on an instant messaging application.

19 Claims, 11 Drawing Sheets

(56) References Cited

U.S. PATENT DOCUMENTS

| | | | |
|---|---|---|---|
| 11,593,826 B1* | 2/2023 | Chen | A63F 13/69 |
| 2004/0224772 A1* | 11/2004 | Canessa | A63F 13/46 |
| | | | 463/40 |
| 2005/0198508 A1 | 9/2005 | Beck | |
| 2008/0059570 A1 | 3/2008 | Bill | |
| 2008/0262911 A1* | 10/2008 | Altberg | G06Q 30/02 |
| | | | 715/757 |
| 2009/0210483 A1* | 8/2009 | Pierce | G06N 3/006 |
| | | | 709/203 |
| 2009/0276707 A1* | 11/2009 | Hamilton, II | H04L 51/222 |
| | | | 715/753 |
| 2009/0282109 A1* | 11/2009 | Lyle | H04L 67/14 |
| | | | 709/206 |
| 2010/0041457 A1* | 2/2010 | Cook | A63F 13/533 |
| | | | 463/43 |
| 2011/0047486 A1* | 2/2011 | Jones | G06Q 30/02 |
| | | | 715/757 |
| 2011/0302509 A1 | 12/2011 | Leacock et al. | |
| 2012/0011453 A1 | 1/2012 | Shimono et al. | |
| 2013/0067002 A1* | 3/2013 | Heikes | G06Q 10/107 |
| | | | 709/206 |
| 2013/0244778 A1* | 9/2013 | Barclay | G07F 17/3272 |
| | | | 463/31 |
| 2015/0230278 A1* | 8/2015 | Wei | H04W 76/11 |
| | | | 370/338 |
| 2015/0350145 A1* | 12/2015 | Sanghavi | H04L 51/224 |
| | | | 709/206 |
| 2016/0163070 A1* | 6/2016 | Leacock | G06F 16/444 |
| | | | 715/758 |
| 2016/0250518 A1 | 9/2016 | Nakai et al. | |
| 2017/0026324 A1 | 1/2017 | Adkins et al. | |
| 2017/0282065 A1* | 10/2017 | Miller | A63F 13/847 |
| 2018/0248824 A1* | 8/2018 | Luo | H04L 51/10 |
| 2018/0296929 A1* | 10/2018 | Vaccari | H04L 51/02 |
| 2018/0331993 A1* | 11/2018 | Tian | H04L 51/063 |
| 2019/0204994 A1* | 7/2019 | Tippana | H04L 51/42 |
| 2019/0342519 A1 | 11/2019 | Van Os et al. | |
| 2020/0059445 A1 | 2/2020 | Brown et al. | |
| 2020/0092234 A1* | 3/2020 | Yang | H04L 67/306 |

FOREIGN PATENT DOCUMENTS

| | | |
|---|---|---|
| CN | 107908482 A | 4/2018 |
| CN | 109126142 A | 1/2019 |
| CN | 110635995 A | 12/2019 |
| CN | 110772799 A | 2/2020 |
| CN | 111884914 A | 11/2020 |
| JP | 2012-18569 A | 1/2012 |
| JP | 2013-52285 A | 3/2013 |
| JP | 2015-8836 A | 1/2015 |
| JP | 2016-163684 A | 9/2016 |
| JP | 2019-208820 A | 12/2019 |
| WO | WO 2022/017071 A1 | 1/2022 |

OTHER PUBLICATIONS

English language translation for Search Report for priority application No. PCT/CN2021/100047 dated Sep. 23, 2021, 2p.
Office Action and Search Report for Chinese application No. CN 202010723529.1 dated Mar. 2, 2021, 7p, in Chinese language.
Concise Explanation of Relevancy for A14 and A15.
Extended European Search Report for application No. EP 21846080.6 dated Jun. 28, 2023, 7p.
Notice of Reasons for Refusal for Japanese application No. 2022-567173 dated Nov. 7, 2023, 7p, in Japanese language.
English language translation of Notice of Reasons for Refusal for Japanese application No. 2022-567173 dated Nov. 7, 2023, 7p.
Author unknown, Books, first edition, SB Creative Company, p. 57, in Japanese, (see citing Office Action for relevance).
Author unknown, [Release] "Lineage", the ac current between the players, 4Gamer.net, 2007, 4 mos, 10 days, found on the internet @ https://www.4gamer.net/games/001/G000189/20070410184534, 8p, in Japanese (see citing Office Action for relevance).
Author unknown, title unknown, found on the internet @ https://www.monster-strike.com/news/20180419_5.html, 12p, in Japanese, (see citing Office Action for relevance).
Office Action issued in Japanese Patent Application No. 2024-064544 dated Apr. 22, 2025, w/English translation, 9 pages.

* cited by examiner

COMMUNICATION METHOD AND APPARATUS BASED ON AVATAR INTERACTION INTERFACE, AND COMPUTER DEVICE

RELATED APPLICATION

This application claims is a continuation application of International Application No. PCT/CN2021/100047, filed on Jun. 15, 2021, which claims priority to Chinese Patent Application No. 202010723529.1, entitled "COMMUNICATION METHOD AND APPARATUS BASED ON VIRTUAL ROLE INTERACTION INTERFACE AND COMPUTER DEVICE" filed with the China National Intellectual Property Administration on Jul. 24, 2020, both of which are incorporated by reference in their entirety.

TECHNICAL FIELD

This disclosure relates to the field of computer technologies, and in particular, to a communication method and apparatus based on a virtual role interaction interface, a computer device, and a storage medium.

BACKGROUND

With the development of Internet technologies, various virtual role interaction interfaces are loved by the public. A user may communicate with another user in the virtual role interaction interface, for example, the user may directly add another user as a friend in the virtual role interaction interface, or communicate and exchange a contact manner with another user by using a chat channel in the virtual role interaction interface. However, in a current communication manner based on a virtual role interaction interface, communication efficiency between users is low.

SUMMARY

Embodiments of this disclosure provide a communication method and apparatus based on a virtual role interaction interface, a computer device, and a storage medium.

A communication method based on a virtual role interaction interface, performed by a first terminal device and including:
displaying a virtual role interaction interface of a virtual role interaction disclosure, the virtual role interaction interface including a target virtual role identifier;
displaying an instant session message triggering control on the virtual role interaction interface in response to a trigger operation on the target virtual role identifier;
displaying a message input interface in response to a trigger operation on the instant session message triggering control; and
transmitting, after a session message is inputted in the message input interface, the session message used for displaying on an instant messaging application to an instant messaging user account corresponding to the target virtual role identifier.

A communication apparatus based on a virtual role interaction interface, including:
a virtual role interaction interface display module, configured to display a virtual role interaction interface of a virtual role interaction application, the virtual role interaction interface including a target virtual role identifier;
a first response module, configured to: display an instant session message triggering control on the virtual role interaction interface in response to a trigger operation on the target virtual role identifier;
a second response module, configured to display a message input interface in response to a trigger operation on the instant session message triggering control; and
a transmitting module, configured to: transmit, to an instant messaging user account corresponding to the target virtual role identifier after a session message is inputted in the message input interface, the session message used for displaying on an instant messaging application.

A computer device includes a memory and one or more processors, where the memory stores computer readable instructions, when executed by the processor, causing the computer device to perform the methods disclosed in this disclosure.

One or more non-transitory computer readable storage media, storing computer readable instructions, when the computer readable instructions are executed by one or more processors, the one or more processors perform the methods disclosed in this disclosure.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and a person skilled in the art may still derive other drawings from these accompanying drawings without creative efforts.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
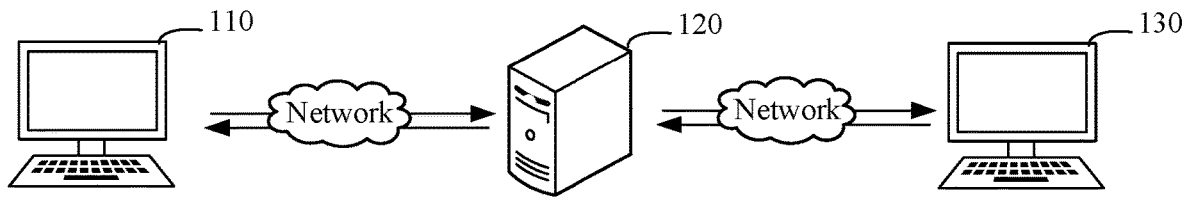
FIG. 1 is an application environment diagram of a communication method based on a virtual role interaction interface according to an embodiment.

A communication method based on a virtual role interaction interface provided in this application may be applied to an application environment shown in FIG. 1. FIG. 1 is an application environment diagram of a communication method based on a virtual role interaction interface according to an embodiment. The application environment includes a first terminal device 110, a server 120, and a second terminal device 130. The first terminal device 110 and the server 120 interact with each other by using a network. The terminal device may be an intelligent terminal such as a smartphone, a tablet computer, a notebook computer, a desktop computer, an intelligent television, or the like. Both the first terminal device 110 and the second terminal device 130 are equipped with a virtual scene interaction application and an instant messaging application. The virtual scene interaction application may be an application program that is authorized to log in by using an instant messaging account. The virtual scene interaction application is configured to display a virtual role interaction interface, the virtual role interaction interface including a target virtual role identifier, and display an instant session message triggering control on the virtual role interaction interface in response to a trigger operation on the target virtual role identifier; display a message input interface in response to a trigger operation on the instant messaging triggering control, and transmit, to an instant messaging user account corresponding to the target virtual role identifier after a session message is inputted in the message input interface, the session message used for displaying on an instant messaging application. The instant messaging client is configured to display the received session message. The server 120 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and AI platform. A quantity of terminal devices and servers is not limited in this application.

Figure 2:
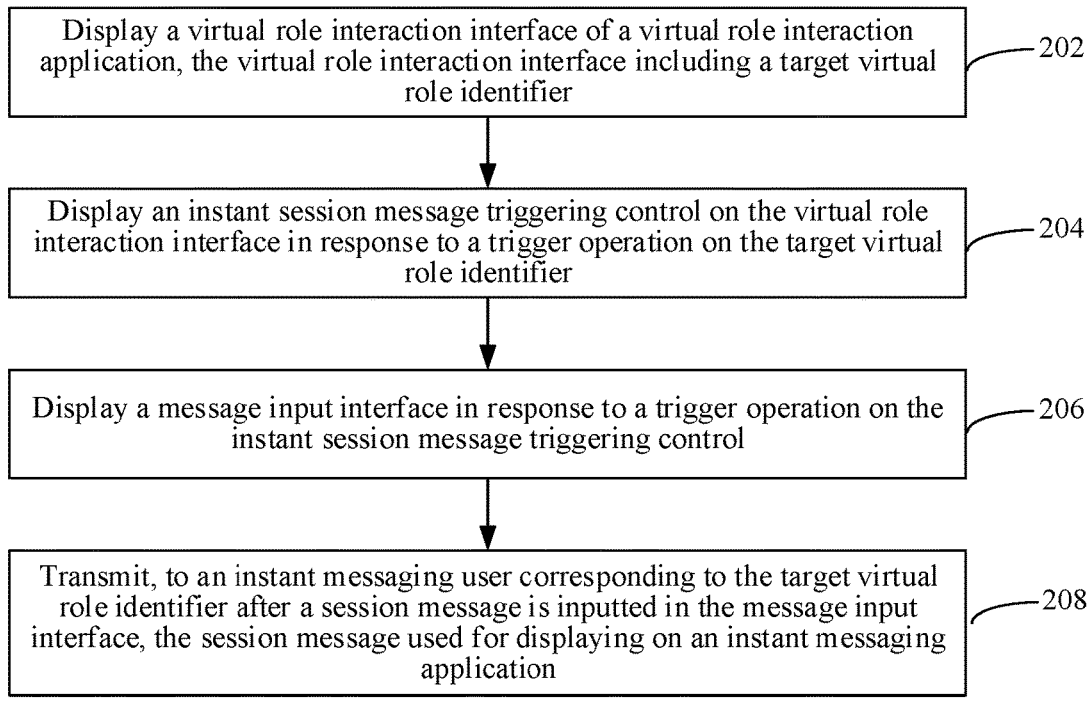
FIG. 2 is a schematic flowchart of a communication method based on a virtual role interaction interface according to an embodiment.

In an embodiment, FIG. 2 is a schematic flowchart of a communication method based on a virtual role interaction interface according to an embodiment, and a communication method based on a virtual role interaction interface is provided. An example in which the method is applied to the first terminal device 110 in FIG. 1 is used for description, and the method includes the following steps:

Step 202: Display a virtual role interaction interface of a virtual role interaction application, the virtual role interaction interface including a target virtual role identifier.

The virtual role interaction interface may be used for simulating three-dimensional virtual space, or may be used for simulating two-dimensional virtual space. The virtual role interaction interface may be a mobile game interface, a client game interface, a virtual role interaction interface in augmented reality, virtual reality (VR), mix reality (MR), or the like, and is not limited thereto. The virtual role interaction application may be a mobile game application, a client game application, an augmented reality-related application, a virtual reality-related application, a mix reality-related application, or the like. In addition to the target virtual role identifier, the virtual role interaction interface may further include a sky, a land, a sea, a building, a mountain forest, and the like. Virtual reality is a new type of computer technology evolving from various information technologies such as computer vision and human-computer interaction, etc. With a display device, people can travel to be immersed in a completely virtual world by separating vision from a real world. Augmented reality is to overlay virtual information onto a specific position based on an identified object, in which virtual information can be exchanged in real time to enhance a visual effect. As a product of virtual reality and augmented reality, mixed reality is a new, interactive, and visual environment that combines a real world and a virtual, in which digital and physical objects coexist. Specifically, this application may be applied to a game interface, and tasks are completed by using various virtual roles. Alternatively, the method may be further applied to a virtual role travel interface, and a user may travel in different cities or scenic spots.

A virtual role identifier is a virtual role identifier that is used in the virtual role interaction interface to represent a user. The target virtual role identifier may be specifically at least a part of a target virtual role image, a target virtual role name, or a target virtual role account, but is not limited thereto. For example, the virtual role image may be in any form, such as a human or another animal. The target virtual role is a virtual role corresponding to a trigger operation.

Specifically, the first terminal device displays the virtual role interaction interface by using the virtual role interaction application, and displays the target virtual role identifier in the virtual role interaction interface. For example, the virtual role interaction interface is a game interface, and the virtual role is a game player. A game player interface displayed in the game interface may be a game friend list, a game over interface, or a game ongoing interface.

Step 204: Display an instant session message triggering control on the virtual role interaction interface in response to a trigger operation on the target virtual role identifier.

The instant session message triggering control is used for triggering an instant session with a virtual role in the instant messaging application. For example, the instant session message triggering control is used for triggering a WeChat session or a QQ session.

Specifically, the first terminal device displays the instant session message control on the virtual role interaction interface in response to a trigger operation on the target virtual role. For example, the instant session message control can be displayed on the virtual role information interface of the target virtual role. Specifically, if the user taps the target virtual role identifier, a WeChat greeting button is displayed on the virtual role information interface, where the WeChat greeting button is an instant session message control.

Step 206: Display a message input interface in response to a trigger operation on the instant session message triggering control.

The message input interface is an interface used for inputting a message. A message input manner may be that a message is inputted by using a keyboard in the message input interface, a pre-set message in the interface is selected, or the like. The message input interface may display identity information of an instant messaging user account corresponding to the target virtual role, for example, a user name and a personalized signature and are not limited thereto, and may further include a message input area, a current virtual role identifier name, an instant session message transmitting control, and the like.

Specifically, the first terminal device displays the message input interface in the virtual role interaction interface in response to a trigger operation on the instant session message triggering control.

Step 208: Transmit, to an instant messaging user account corresponding to the target virtual role identifier after a session message is inputted in the message input interface, the session message used for displaying on an instant messaging application.

The session message refers to a message that is displayed in the instant messaging application and that is in a session process. The session message may be specifically a text session message, a voice session message, a picture session message, a video session message, a link session message, or the like. The picture session message may be, for example, an emoji message. The link session message may be specifically a resource transfer message, an article link sharing message, or the like.

The instant messaging application is an application that can transmit and receive an Internet message in an instant, or the like. For example, the instant messaging application may be QQ or WeChat. The virtual role interaction application is not the same as the instant messaging application. The instant messaging user account is a user registered on the instant messaging application. The instant messaging user account may be considered as a virtual user on the Internet. Different instant messaging user accounts can be distinguished by using instant messaging accounts. That is, each instant messaging user account has a unique corresponding instant messaging account. Each virtual role has a corresponding instant messaging user account. An instant messaging application account bound to each virtual role may be at least one, for example, bound to only a WeChat account, or bound to only a QQ account, or bound to both a WeChat account and a QQ account. The instant messaging application is triggered by the instant session message triggering control.

Specifically, after a session message is inputted in the message input interface, the first terminal device transmits the session message to the instant messaging user account corresponding to the target virtual role, where the session message is displayed by using the instant messaging application on a second terminal corresponding to the instant messaging user account. The session message may also be used for displaying in the instant messaging application of the first terminal device. Thus, a session with the instant messaging user account corresponding to the target virtual role identifier is created in the instant messaging application, and a session message corresponding to the instant messaging user account corresponding to the target virtual role identifier is displayed in a session interface of the instant messaging application. For example, if the session message transmitted by the first terminal device is "Hello, I am player A", the message "Hello, I am player A" may be displayed on both the instant messaging application of the first terminal device and the instant messaging application of the second terminal device.

In this embodiment, in response to a transmitting operation triggered in the message input interface, after a session message is inputted in the message input interface, the session message used for displaying on the instant messaging application is transmitted to the instant messaging user account corresponding to the target virtual role identifier.

In this embodiment, if the instant messaging application account bound to the current virtual role identifier has only a WeChat account, a session message used for displaying in WeChat may be transmitted. If the instant messaging application account bound to the current virtual role identifier includes two types: a QQ account and a WeChat account, a session message may be transmitted by using the QQ application, or a session message may be transmitted by using WeChat.

In this embodiment, when the instant messaging applications bound to the current virtual role identifier and the target virtual role identifier are the same instant messaging application, a session message may be transmitted by using the same instant messaging application. For example, if both the current virtual role identifier and the target virtual role are bound to WeChat, the current virtual role identifier may transmit a session message used for displaying in the WeChat application.

In this embodiment, if the instant messaging applications bound to the current virtual role identifier and the target virtual role identifier are different instant messaging applications, a first instant messaging account of a first instant messaging application corresponding to the current virtual role identifier and a second instant messaging account of a second instant messaging application corresponding to the first instant messaging account are acquired, and a session message used for displaying on the second instant messaging application is transmitted to the target instant messaging account of the second instant messaging application corresponding to the target virtual role.

In the foregoing communication method based on a virtual role interaction interface, the instant session message triggering control is displayed by performing a trigger operation on the target virtual role identifier, that is, the message triggering control that connects the virtual role interaction interface to the instant messaging application is provided in the virtual role interaction interface. A trigger operation is performed on the session message triggering control, and a session message is transmitted to the instant messaging user corresponding to the target virtual role identifier. Therefore, after the virtual role interaction interface is disabled, chatting with the instant messaging user corresponding to the virtual role can be performed, communication efficiency can be improved, interaction between applications can be improved, user retention rates of the virtual role interaction application and the instant messaging application can be increased, and exposure of other related functions of the virtual role interaction interface and the instant messaging application can be improved.

In an embodiment, the communication method based on a virtual role interaction interface further includes: displaying, on a function interface of the instant messaging application, a session list entry of a session triggered by the virtual role interaction interface, and displaying a session triggered by using the virtual role interaction interface.

In an embodiment, the communication method based on a virtual role interaction interface further includes: displaying a function interface of the instant messaging application; displaying, on the function interface, a session list entry of a session triggered by the virtual role interaction interface; and displaying a session list in response to a trigger operation on the session list entry, the session list including the session triggered by using the virtual role interaction interface.

The function interface of the instant messaging application is an interface that provides a related function in the instant messaging application. For example, the function interface of WeChat may include Moments, Scan, Shake, Top Stories, Search, Nearby, Shopping, and Games. The function interface of the instant messaging application is different from the session interface used for generating a session in the instant messaging application. The function interface of the instant messaging application is independent of the session interface used for generating a session in the instant messaging application.

The session list entry is one of functions displayed in the function interface. For example, "Games" in the function interface of WeChat may be a session list entry. The session list is used for displaying at least one session. The session list may further display a session message, an instant messaging user name, a session message transmitting time, and the like. A session triggered by using the virtual role interaction interface may be a session of the instant messaging user corresponding to the target virtual role, or may be a session of an instant messaging user corresponding to another virtual role.

Specifically, the first terminal device displays the function interface of the instant messaging application, and displays, on the function interface, a session list entry of a session triggered by the virtual role interaction interface. When there is an unread message in the session list, a message prompt mark is displayed at the session list entry to prompt the user that there is a new message. The information prompt mark may be specifically a red dot, highlighted, selected, or the like. The first terminal device displays a session list in response to a trigger operation on the session list entry, the session list including the session triggered by using the virtual role interaction interface.

Figure 3A:
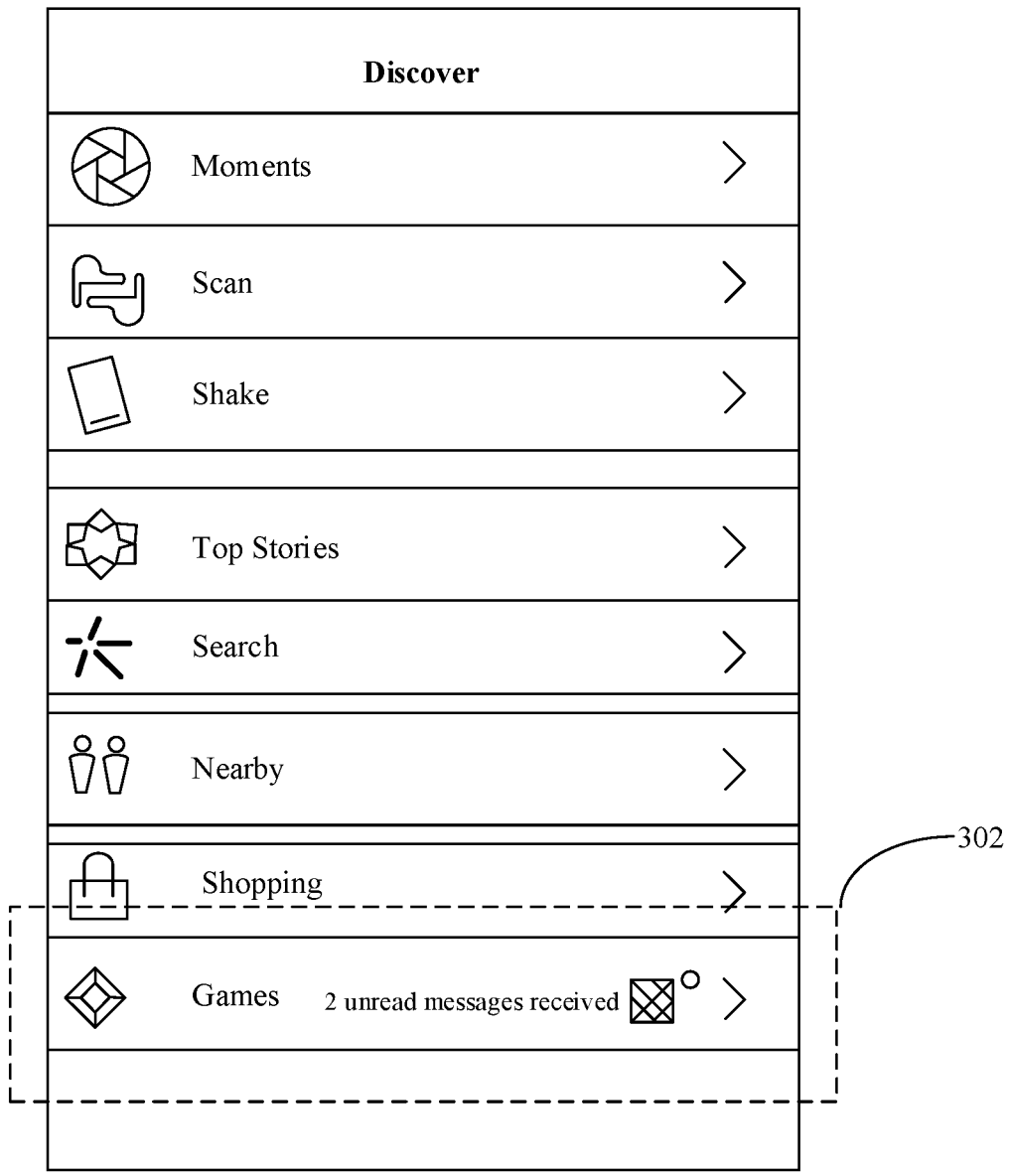
FIG. 3(a) is a schematic diagram of a function interface of an instant messaging application according to an embodiment.
Figure 3B:
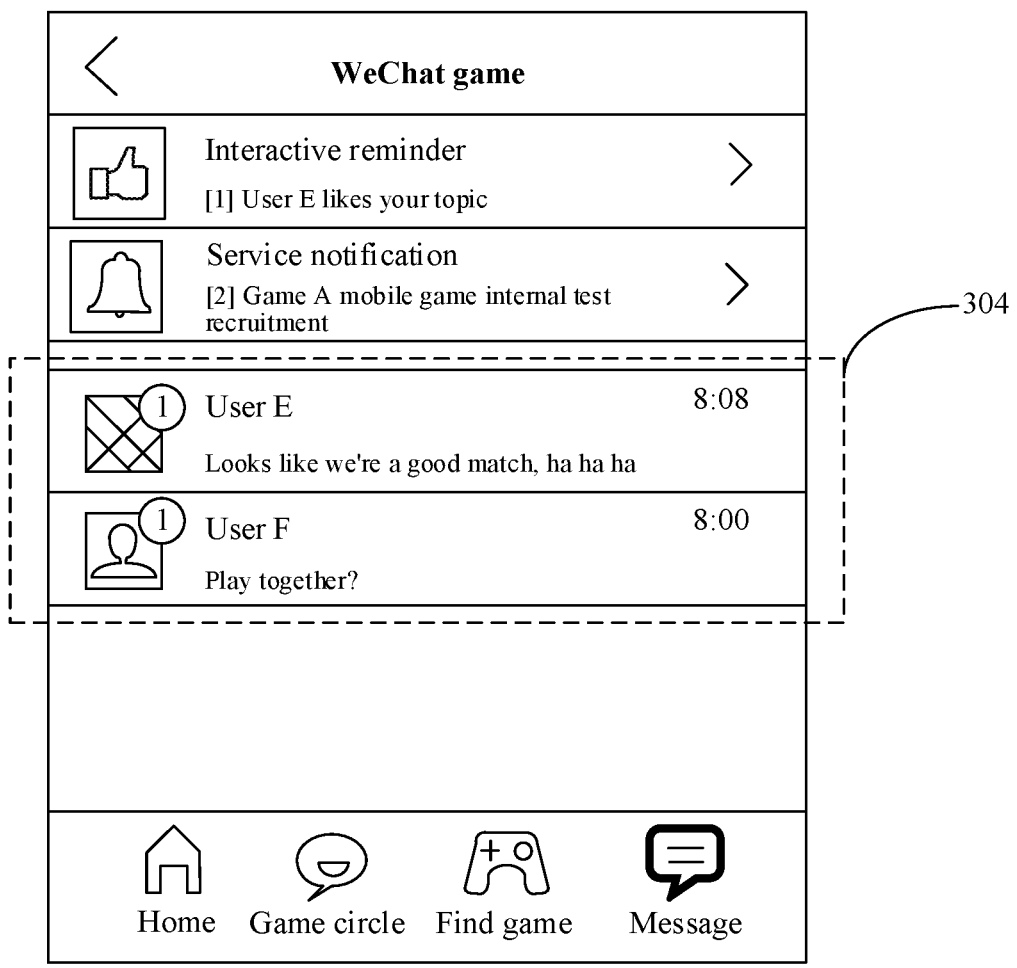
FIG. 3(b) is a schematic diagram of a session list interface according to an embodiment.

In this embodiment, FIG. 3(a) is a schematic diagram of a function interface of an instant messaging application according to an embodiment. The first terminal device displays a function interface of the instant messaging application. FIG. 3(a) may be specifically a schematic diagram of a function interface of WeChat. The function interface may be displayed after "Discovery" in the instant messaging application is triggered. The function interface includes functions such as Moments, Scan, Shake, Top Stories, Search, Nearby, Shopping, and Games. 302 is a session list entry of a session triggered by the virtual role interaction interface. The session list entry is "Games". In addition, a profile photo and a message prompt mark corresponding to a virtual role may be displayed in an area corresponding to the session list entry. As shown in the figure, a small circle on the profile photo is a message prompt mark. FIG. 3(b) is a schematic diagram of a session list interface according to an embodiment. In response to a trigger operation on "Games", a session list interface is displayed, and the session list interface includes a session list 304. In this embodiment, the session list interface may be a WeChat game interface, and may display a home page control, a game circle control, a game search control, and a message control. Certainly, the foregoing controls may not be displayed, or some of the controls are displayed. This is not limited in this embodiment of this disclosure. In the session list interface, interactive prompts such as "1 User E likes your topic" and service notification "2 Game A mobile game internal test recruitment" can be displayed. A session triggered by using the virtual role interaction interface may be a session with "user E" and "user F". The unread message in FIG. 3(b) is "Looks like we're a good match, ha ha ha" transmitted by user E at 8:08, and "Play together?" transmitted by user F at 8:00.

In this embodiment, similarly, the second terminal may display a function interface of the instant messaging application. On the function interface, a session list entry of a session triggered by the virtual role interaction interface is displayed, and a session list is displayed in response to a trigger operation on the session list entry. The session list includes a session triggered by the virtual role interaction interface.

In the foregoing communication method based on a virtual role interaction interface, a session list entry of a session triggered by the virtual role interaction interface is displayed on the function interface of the instant messaging application, and a session triggered by the virtual role interaction interface is displayed, so that a session message transmitted by the instant messaging user corresponding to the virtual role can be received in the instant messaging application, thereby improving communication efficiency. In addition, because a session is entered from the session list entry of the function interface, a session between the current instant messaging user and a friend is distinguished from a session between the current instant messaging user and a net friend, so that the session between the current instant messaging user and the friend is not affected, a real life is distinguished from the virtual interface, and disturbance can be prevented.

In an embodiment, the communication method based on a virtual role interaction interface further includes: selecting, in response to a session selection operation triggered in the session list, a target session with a target instant messaging user account from the session list, and entering a session interface of the target session; and displaying, in a virtual role-related information display area of the session interface, related information of a virtual role corresponding to the target instant messaging user account in the virtual role interaction interface.

The target instant messaging user account is an instant messaging user account corresponding to a session selection operation. For example, if the session list includes an instant messaging user account A and an instant messaging user account B, and a user selected in the session selection operation is the instant messaging user account A, the instant messaging user account A is the target instant messaging user account. The target session is a session with the target instant messaging user account.

The virtual role-related information display area is an area used for displaying related information of the virtual role in the session interface. The related information of the virtual role may be specifically related information in the virtual role interaction interface. The related information of the virtual role may specifically include at least one of a virtual role interaction interface name, a virtual role name, a relationship with the virtual role corresponding to the target instant messaging user account in the virtual role interaction interface, ranking information in the virtual role interaction interface, or time of transmitting a session message for the first time, but is not limited thereto.

Figure 4A:
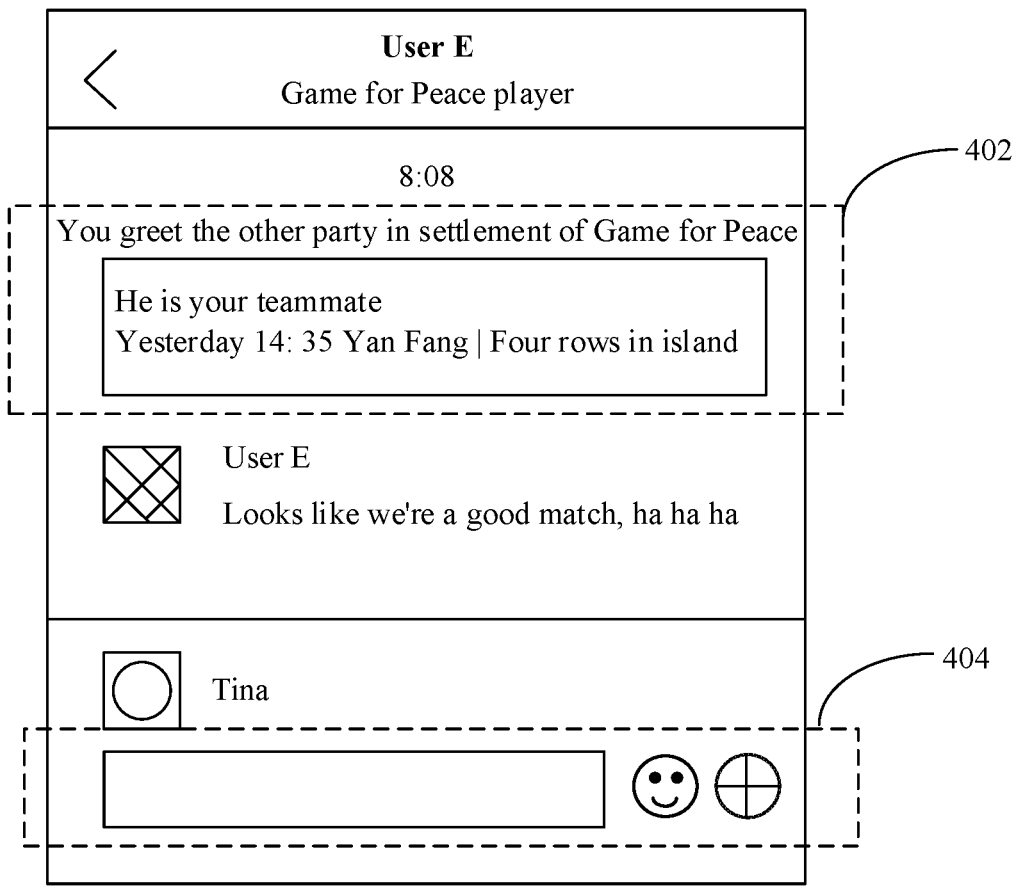
FIG. 4(a) is a schematic interface diagram of a target session with a target instant messaging user account according to an embodiment.
Figure 4B:
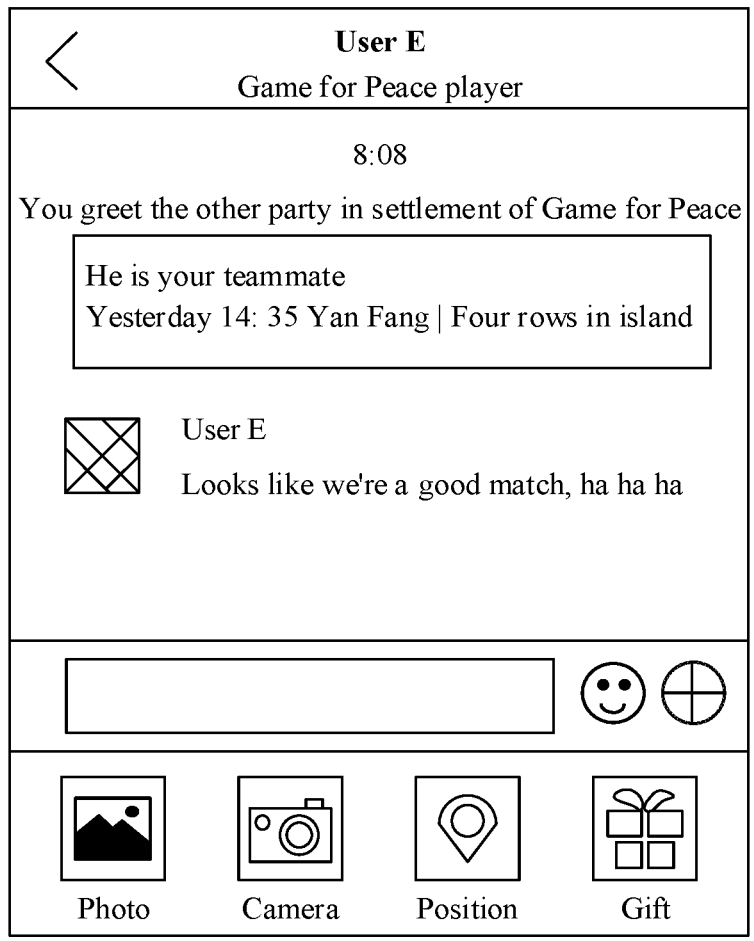
FIG. 4(b) is a schematic interface diagram of a target session with a target instant messaging user account according to another embodiment.

Specifically, the first terminal device selects, in response to the session selection operation triggered in the session list, the target session with the target instant messaging user account from the session list, and enters the session interface of the target session. FIG. 4(*a*) is a schematic interface diagram of a target session with a target instant messaging user account according to an embodiment. FIG. 4(*a*) includes a role-related information display area 402 and a session input area 404. The role-related information display area 402 displays related information of the virtual role corresponding to the target instant messaging user account in the virtual role interaction interface. As shown in the figure, the related information of the virtual role includes the virtual role interaction interface for initiating a session message. You greet the other party in settlement of Game for Peace. The relationship with the virtual role corresponding to the target instant messaging user account in the virtual role interaction interface: He is your teammate; time of transmitting the session message for the first time: Yesterday 14:35; virtual role name: Yan Fang; Ranking information in the virtual role interaction interface: Four rows in island. The current virtual role identifier name Tina can also be displayed. When a trigger operation for another session message is received in the session input area in FIG. 4(*a*), an interface shown in FIG. 4(*b*) is displayed. FIG. 4(*b*) is a schematic interface diagram of a target session with a target instant messaging user account according to another embodiment. That is, when the "+" sign is tapped in FIG. 4(*b*), the photo, camera, position, and gift are displayed in the session input area. The photo may be used for transmitting a picture, the camera may be used for shooting a picture or a video, the position may be used for transmitting position information, and the gift may be used for presenting a prop or the like.

In the foregoing communication method based on a virtual role interaction interface, the session interface of the target session with the target instant messaging user account is entered in the virtual role interaction interface. Because the user may forget a role of transmitting a session message, the virtual role-related information display area displays the related information of the virtual role corresponding to the target instant messaging user account in the virtual role interaction interface, so that the user can more intuitively learn of an identity of the instant messaging user account in the virtual role interaction interface, and communication efficiency is improved.

Figure 5:
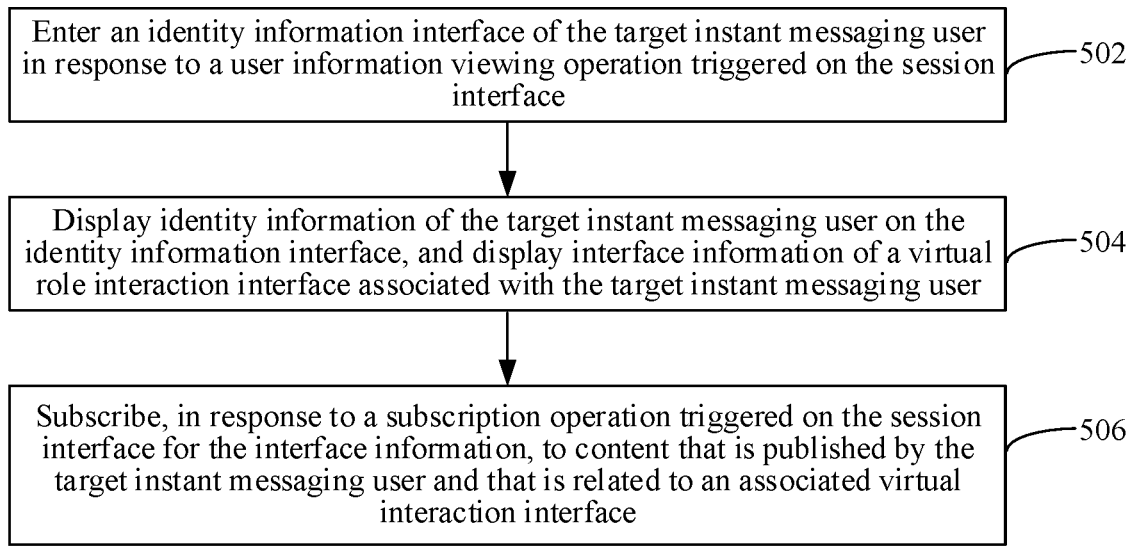
FIG. 5 is a schematic flowchart of a target instant messaging user account according to an embodiment.

In an embodiment, FIG. 5 is a schematic flowchart of a target instant messaging user account according to an embodiment, and the communication method based on a virtual role interaction interface further includes:

Step 502: Enter an identity information interface of the target instant messaging user account in response to a user information viewing operation triggered on the session interface.

The user information viewing operation is an operation used for viewing user information in the session interface. The identity information interface displays the identity information of the target instant messaging user account.

Specifically, the first terminal device responds to the user information viewing operation triggered on the session interface, for example, may tap the profile photo to trigger the user information viewing operation to enter the identity information interface of the target instant messaging user account.

Step 504: Display identity information of the target instant messaging user account on the identity information interface, and display interface information of a virtual role interaction interface associated with the target instant messaging user account.

The identity information may specifically include at least one of name, age, gender, hobby, or personalized signature, but is not limited thereto. By default, the identity information of the target instant messaging user account may be the same as instant messaging identity information. The interface information of the virtual role interaction interface includes interface information generated by the instant messaging user account in the virtual role interaction interface, for example, a virtual interaction interface name related to the instant messaging user account, the honor and ranking obtained in the virtual interaction interface, but is not limited thereto.

Figure 6:
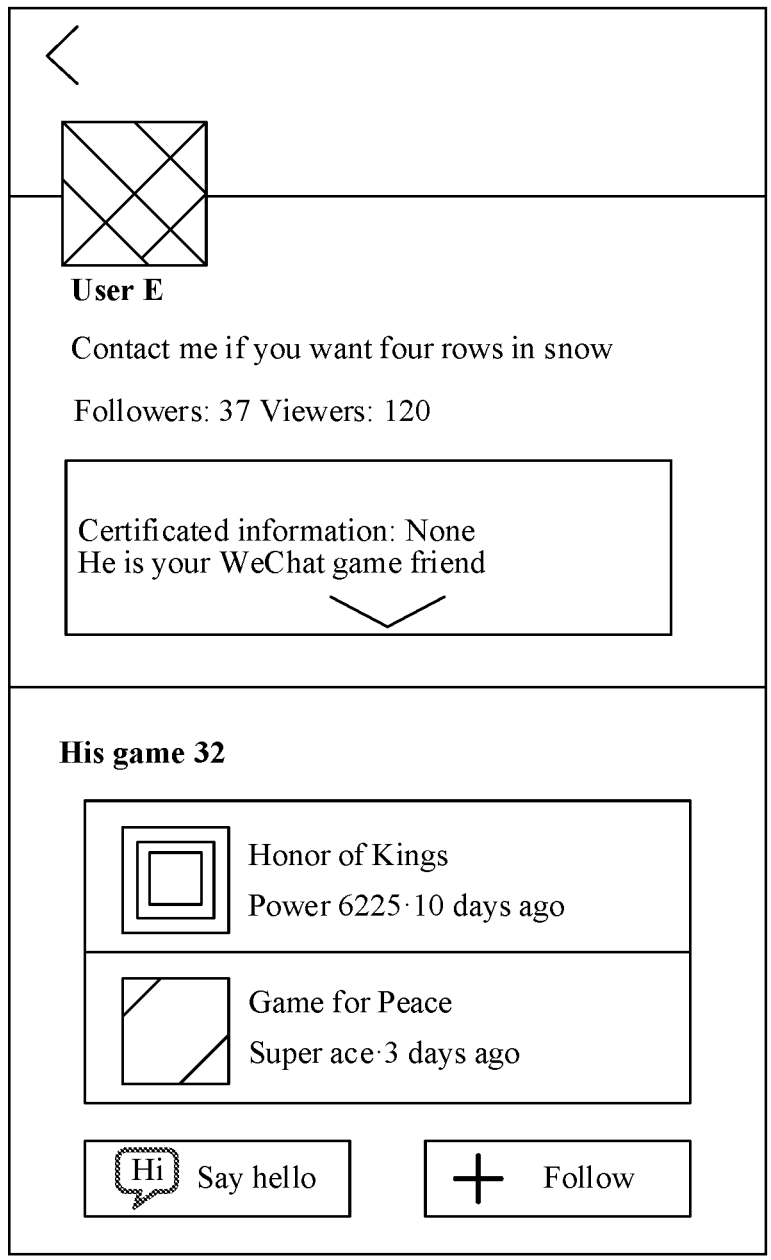
FIG. 6 is a schematic diagram of an identity information interface according to an embodiment.

Specifically, the identity information interface of the target instant messaging user account shown in FIG. 6 is entered in response to the user information viewing operation triggered on the session interface. FIG. 6 is a schematic diagram of an identity information interface according to an embodiment. The identity information interface may also be referred to as a personal home page. The first terminal device displays the identity information of the target instant messaging user account, for example, the name is user E, and a personalized signature is "contact me if you want four rows in snow", 37 people follow him, 120 people has viewed him, and a relationship with the current virtual role identifier is that he is your WeChat game friend. The interface information of the virtual role interaction interface associated with the target instant messaging user account may be: His game 32, Honor of Kings Power 6225•10 days ago, Game for Peace Super ace•3 days ago, and the like shown in the figure. The identity information of the target instant messaging user account and the interface information of the associated virtual role interaction interface may be displayed on the WeChat game card. A greeting control may be configured to return to the session interface shown in FIG. 4(*b*). Alternatively, the virtual role interaction interface may be triggered to display by triggering the greeting control.

Step 506: Subscribe, in response to a subscription operation triggered on the session interface for the interface information, to content that is published by the target instant messaging user account and that is related to an associated virtual role interaction interface.

The subscription operation may be used for displaying, on the instant messaging interface of the current instant messaging user account, content that is published by the target instant messaging user account and that is related to the associated virtual role interaction interface. Content related to the associated virtual role interaction interface may be activity related content of the virtual role interaction interface, team content of the virtual role interaction interface, or the like.

Specifically, the first terminal device subscribes, in response to the subscription operation triggered on the session interface for the interface information, to the content that is published by the target instant messaging user account and that is related to the associated virtual role interaction interface. For example, in response to the "+ follow" operation triggered for the interface information in FIG. 6, content related to an associated game interface published by user E may be followed. In the foregoing example, "+ follow" is a subscription operation, the target instant messaging user account is "user E", and the virtual role interaction interface is "Games".

In the foregoing communication method based on a virtual role interaction interface, the identity information of the target instant messaging user is displayed on the identity information interface, the interface information of the virtual role interaction interface associated with the target instant messaging user is displayed, the content related to the associated virtual role interaction interface and published by the target instant messaging user can be subscribed, and a virtual role for transmitting a session message can be kept in contact by using the instant messaging application, thereby improving communication efficiency.

In an embodiment, the identity information is different from instant messaging identity information of the target instant messaging user account, and is also different from role information of the virtual role corresponding to the target instant messaging user account in the virtual role interaction interface.

The instant messaging identity information refers to identity information that is set in the instant messaging application by the instant messaging user account, and is used for displaying in the instant messaging application. Role information of a virtual role means identification role information set by a user in the virtual role interaction interface. The identity information of the target instant messaging user account is different from the identity information of the instant messaging user account and the role information of the virtual role. For example, an instant messaging user account name is "Zhang", a virtual role name may be "user E", and an identity name of a target instant messaging user account may be "Handsome Zhang". Specifically, a WeChat name may be "Zhang", a game role name is "user E", and a WeChat game name is "handsome Zhang".

In the foregoing communication method based on a virtual role interaction interface, if the identity information is different from the instant messaging user information and the role information of the virtual role, the identity information of the target instant messaging user is distinguished from the instant messaging user information and the role information, personal privacy can be protected, and disturbance can be prevented.

In an embodiment, the identity information is generated by using an identity information setting step, and the identity information setting step includes: displaying an identity information input interface in response to an identity information creation operation triggered on the user information interface of the target instant messaging user account; acquiring content inputted in the identity information input interface; and setting, in response to an identity information confirmation operation triggered on the identity information input interface, the inputted content as the identity information of the target instant messaging user account.

The identity information creation operation is used for creating identity information that is different from the instant messaging user account information and the role information. A title of to-be-inputted content may be displayed on the identity information input interface, for example, nickname and gender, which is not limited thereto. The content inputted in the identity information input interface may be, for example, nickname, gender, age, or native place.

Figure 7A:
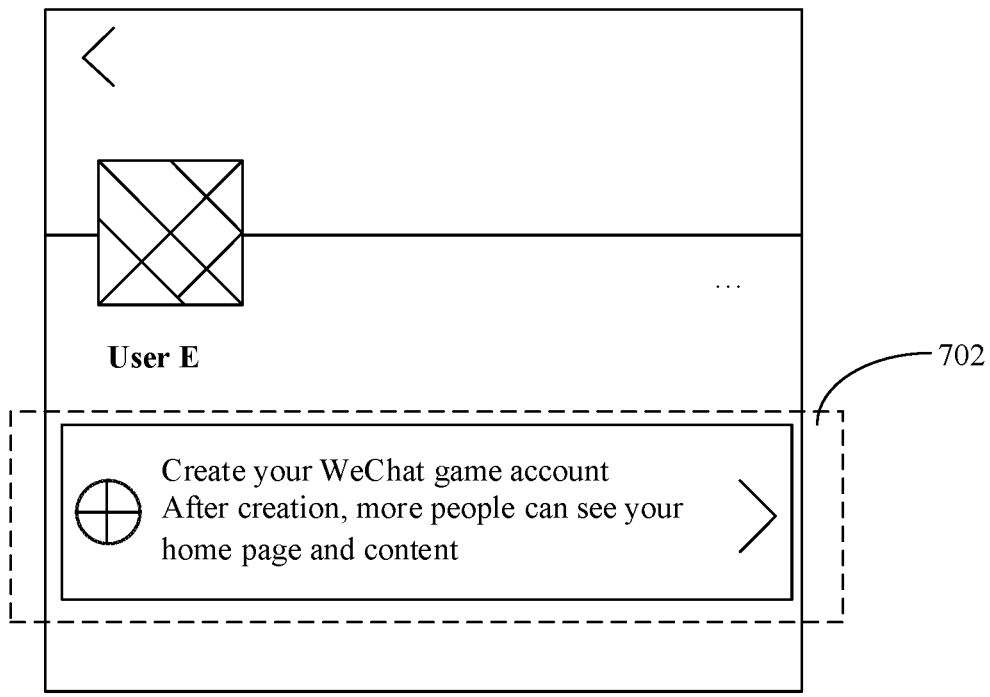
FIG. 7(a) is a schematic interface diagram of a user information interface according to another embodiment.
Figure 7B:
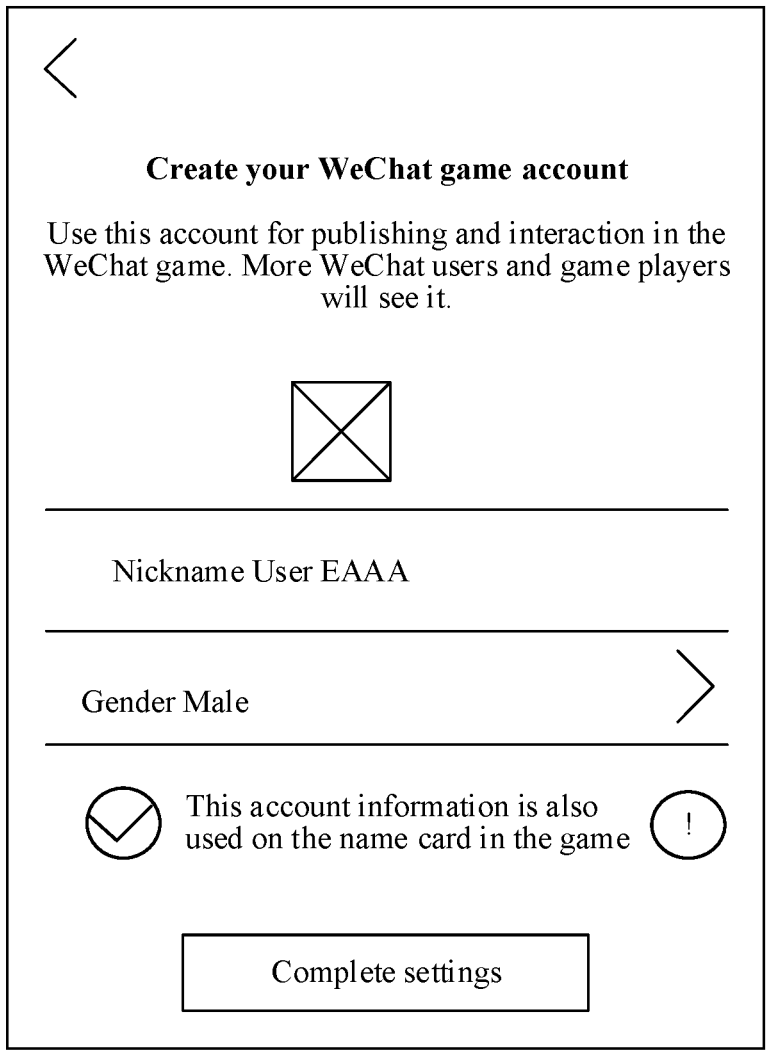
FIG. 7(b) is a schematic interface diagram of an identity information input interface according to an embodiment.
Figure 7C:
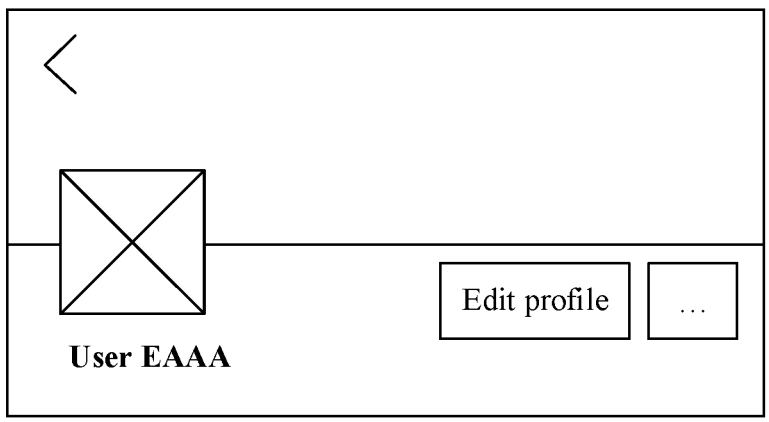
FIG. 7(c) is a schematic interface diagram of a modified user information interface according to an embodiment.

Specifically, FIG. 7(a) is a schematic interface diagram of a user information interface according to another embodiment. An identity creation operation trigger area 702 is included. The terminal device displays an identity information input interface shown in FIG. 7(b) in response to the identity creation operation triggered in the identity creation operation trigger area 702. FIG. 7(b) is a schematic interface diagram of an identity information input interface according to an embodiment. A prompt is displayed: Create your WeChat game account for publishing and interaction in the WeChat game. More WeChat users and game players will see it. The profile photo, the nickname, and the gender in FIG. 7(b) may be configured according to a user requirement. As shown in the figure, the profile photo is changed and the nickname is also changed to "User EAAA". In the figure, "this account information is also used in the name card in the game", that is, the content inputted in the identity information input interface can also be displayed in the virtual role interaction interface. FIG. 7(c) is a schematic interface diagram of a modified user information interface according to an embodiment. The user nickname has been changed to "User EAAA".

According to the foregoing communication method based on a virtual role interaction interface, content is inputted in the identity information input interface, and the inputted content is set as the identity information of the target instant messaging user, so that the identity information is different from the instant messaging user information and the role information of the virtual role. Therefore, the identity information of the target instant messaging user is distinguished from the instant messaging user information and the role information, and disturbance can be prevented.

In an embodiment, the displaying an instant session message triggering control on the virtual role interaction interface in response to a trigger operation on the target virtual role includes:

displaying, in the virtual role interaction interface in response to the trigger operation on the target virtual role identifier, a virtual role information interface corresponding to the target virtual role identifier; displaying a user information interface in response to a user information query operation triggered on the virtual role information interface; and displaying, on the user information interface, user information of the instant messaging user account corresponding to the target virtual role identifier, and displaying an instant session message triggering control.

The virtual role information interface is used for displaying the identification role information that is set by the user in the virtual role interaction interface. The user information query operation is used for querying the user information of the instant messaging user account corresponding to the virtual role. The user information may be the identity information identifier set by the user the instant messaging user account. Specifically, the user information of the instant messaging user account may be the same as the identity information of the instant messaging user account. A difference lies in that the user information is displayed in the virtual role interaction interface, and the identity information is displayed in the instant messaging application.

Specifically, the first terminal device displays, in the virtual role interaction interface in response to the trigger operation on the target virtual role, a virtual role information interface corresponding to the target virtual role. The first terminal device displays the user information interface on the virtual role interaction interface in response to the user information query operation triggered on the virtual role information interface. On the user information interface, the user information of the instant messaging user account corresponding to the target virtual role is displayed, and the instant session message triggering control is displayed.

In the foregoing communication method based on a virtual role interaction interface, in response to the user information query operation triggered in the virtual role information interface, the user information interface is displayed, the user information of the instant messaging user corresponding to the target virtual role is displayed in the user information interface, and the instant session message control is displayed, so that some user information in the instant messaging application can be displayed in the virtual role interaction interface, thereby improving interaction between applications.

In an embodiment, the communication method based on a virtual role interaction interface further includes: displaying a candidate pre-set message on the message input interface; selecting at least one pre-set message in response to a selection operation on a displayed candidate pre-set message; and determining the selected pre-set message as a session message inputted in the message input interface.

The pre-set message refers to a message fabricated in advance. For example, the pre-set message may be at least one of a pre-set text message, a pre-set picture message, a pre-set voice message, a pre-set video message, or a pre-set link message, but is not limited thereto. The pre-set text message may be, for example, "Hello, teammate". The pre-set picture message may be, for example, an emoji message. The pre-set voice message may be, for example, "Hello, teammate" played in a language, or a song played for a teammate, and is not limited thereto. The pre-set video message may be a prerecorded animated video, or the like, and is not limited thereto.

Specifically, the first terminal device displays the candidate pre-set message on the message input interface. In response to a selection operation on the candidate pre-set message, the first terminal device prompts, by using a check mark, to select at least one pre-set message. For example, the check mark may be ticked on the pre-set message, or the pre-set message is highlighted, or a prompt box is displayed around the pre-set message, and is not limited thereto. The first terminal device determines the selected pre-set message as a session message inputted in the message input interface. For example, pre-set messages "666" and "Hello" are displayed in the message input interface. If the user selects "666", the first terminal device selects the pre-set message "666" as the inputted session message in response to the selection operation. Then, the first terminal device may directly transmit the "666" message to the instant messaging user account corresponding to the target virtual role.

In the foregoing communication method based on a virtual role interaction interface, a candidate pre-set message is displayed on the message input interface. In response to a selection operation on the displayed pre-set message, a pre-set message is selected, and the selected pre-set message is determined as an inputted session message, so that the session message can be quickly transmitted to the instant messaging user corresponding to the target virtual role, thereby improving communication efficiency.

In an embodiment, the communication method based on a virtual role interaction interface further includes: displaying the session message on the instant messaging application logged in by using the instant messaging user account corresponding to the target virtual role identifier; and binding, in response to a trigger operation on the displayed session message, a prop specified in the session message to the target virtual role identifier in the virtual role interaction interface, the prop being to be used by the target virtual role identifier in the virtual role interaction interface.

The pre-set message may include a resource transfer message. The resource transfer may specifically refer to a prop gift or the like. The virtual role can use the prop formulated by the session message in the virtual role interaction interface. The prop in the pre-set message can be used by the virtual role identifier in the corresponding virtual role interaction interface.

Specifically, in the instant messaging application to which the instant messaging user account corresponding to the target virtual role identifier is logged in, the terminal device displays a session message. In response to a trigger operation on the displayed session message, the terminal device binds the prop specified in the session message to the target virtual role identifier in the virtual role interaction interface. For example, the instant messaging user account "user E" corresponding to the target virtual role identifier logs in to WeChat, triggers, in the WeChat game, a session message including game prop gift information, and binds a prop specified in the session message to the target virtual role identifier, so as to use the prop in the game. In the foregoing example, WeChat is the instant messaging application, "user E" is the instant messaging user account name, and a game is the virtual role interaction interface.

In the foregoing communication method based on a virtual role interaction interface, a prop specified in a session message is bound to the target virtual role identifier in the virtual role interaction interface, so that the prop can be presented on the virtual role interaction interface, so that the target virtual role identifier receives and uses the prop, and interaction and communication efficiency between virtual roles is improved.

In an embodiment, the virtual role interaction application corresponding to the virtual role interaction interface includes an instant messaging component of the instant messaging application; and the transmitting, to an instant messaging user account corresponding to the target virtual role identifier, the session message used for displaying on an instant messaging application includes: transmitting, by using the instant messaging component through a communication channel of the instant messaging application, the session message used for displaying in the instant messaging application to the instant messaging user account corresponding to the target virtual role identifier.

The instant messaging component may be specifically a software development kit (SDK) of the instant messaging application. The SDK can request the identity information corresponding to the virtual role identifier from the instant messaging application server, and can transmit a session message. The communication channel of the instant messaging application may be specifically that the first terminal transmits a session message to the instant messaging server, and the instant messaging server transmits the session message to the instant messaging user account corresponding to the target virtual role identifier.

Specifically, the virtual role interaction application corresponding to the virtual role interaction interface includes the SDK of the instant messaging application. The first terminal device transmits a session message to the corresponding instant messaging server by using the instant messaging component, and the instant messaging server transmits, to the instant messaging user account corresponding to the target virtual role identifier, a session message used for displaying on the instant messaging application. For example, the virtual role interaction application is a game and the instant messaging application is WeChat. An installation package of the game may include a part of a software development kit of WeChat. In this case, the first terminal device may transmit, to a WeChat user corresponding to the target virtual role identifier by using the SDK of the WeChat, a session message used for displaying in WeChat.

In the foregoing communication method based on a virtual role interaction interface, the instant messaging component transmits, to the instant messaging user account corresponding to the target virtual role identifier by using the communication channel of the instant messaging application, a session message used for displaying in the instant messaging application, without needing to transmit the message after jumping to the instant messaging application, so that the session message can be directly transmitted in the virtual role interaction interface, thereby improving communication efficiency.

In an embodiment, the transmitting, by using the instant messaging component through a communication channel of the instant messaging application, the session message used for displaying in the instant messaging application to the instant messaging user account corresponding to the target virtual role identifier includes:

acquiring a target virtual role account of the target virtual role; and transmitting the target virtual role account and the session message to an instant messaging server by using the instant messaging component, so that the instant messaging server queries a target instant messaging account corresponding to the target virtual role account, and transmits the session message based on the target instant messaging account.

The virtual role account is used for uniquely identifying the virtual role in the virtual role interaction interface. The virtual role account may include at least one of a number, a letter, a character, and a symbol. The instant messaging account is used for uniquely identifying an instant messaging user in the instant messaging application. The instant messaging account may include at least one of a number, a letter, a character, and a symbol. There is a mapping relationship between the virtual role account and the instant messaging account. In addition, generally, the virtual role account may be inconsistent with the instant messaging account. Each target virtual role account has a corresponding target instant messaging account. The instant messaging server may be a server of the instant messaging application, may be a server in an instant messaging application server cluster, or may be a server configured to implement a communication method based on a virtual role interaction interface.

Specifically, the instant messaging server stores a mapping relationship between a virtual role account and an instant messaging account. The first terminal device acquires the target virtual role account of the target virtual role, and transmits the target virtual role account and the session message to an instant messaging server by using the instant messaging component, so that the instant messaging server queries a target instant messaging account corresponding to the target virtual role account, and transmits the session message based on the target instant messaging account. For example, there is a binding relationship between a game role account and a WeChat account, and the game role account may be an account authorized by WeChat.

In the foregoing communication method based on a virtual role interaction interface, the target virtual role account and the session message are transmitted to the instant messaging server by using the instant messaging component, so that the instant messaging server queries the target instant messaging account corresponding to the target virtual role account, and transmits the session message based on the target instant messaging account, so that a session with a stranger can be implemented in the virtual role interaction interface, thereby improving communication efficiency.

In an embodiment, the communication method based on a virtual role interaction interface further includes: displaying a message interaction interface in the virtual role interaction application in the virtual role interaction interface; and displaying, when a reply message transmitted by the target instant messaging user account corresponding to the target virtual role identifier for any session message is received, the reply message on the message interaction interface.

The message interaction interface in the virtual role interaction application is an interface that is used in the virtual role interaction application to transmit a message to the virtual role identifier and receive a message transmitted by the virtual role identifier. For example, a virtual role A may transmit a message to a virtual role B by using the message interaction interface, and the virtual role A may receive, on the message interaction interface, a message transmitted by the virtual role B.

Specifically, in the virtual role interaction interface, the first terminal device displays a message interaction interface in the virtual interaction application. For example, the message interaction interface may include a message list used for performing message exchange with at least one virtual role identifier, and may further include an interface for performing message exchange with any virtual role identifier. When the first terminal device is still located in the message interaction interface in the virtual role interaction application, and when the current virtual role identifier receives a reply message that is from the target instant messaging user account corresponding to the target virtual role identifier and that is for any session message, the first terminal device directly displays the reply message on the message interaction interface. That is, the second terminal device acquires the reply message that is from the target instant messaging user account and that is for any session message, and transmits the reply message to the instant messaging server in response to a message transmitting operation triggered by the target instant messaging application, so that the instant messaging server transmits the reply message to the virtual role interaction server, and the virtual role interaction server transmits the reply message to the first terminal in which the virtual role interaction application to which the current virtual role identifier is logged in, and displays the reply message on the message interaction interface.

In the foregoing communication method based on a virtual role interaction interface, when a reply message transmitted by the target virtual role identifier is received on the message interaction interface, the reply message is directly displayed on the message interaction interface, that is, when the user stays on the message interaction interface of the virtual role interaction application, the reply message may be directly displayed on the message interaction interface, thereby improving message acquiring efficiency and improving communication efficiency.

In an embodiment, the communication method based on a virtual role interaction interface further includes: receiving a reply message by using the instant messaging application when the message interaction interface in the virtual role interaction application is exited, and the instant messaging user account corresponding to the target virtual role identifier transmits the reply message for any session message; and displaying, after switching to the instant messaging application, the reply message on a session interface of the instant messaging user account corresponding to the target virtual role identifier in the instant messaging application.

Specifically, when the message interaction interface in the virtual role interaction application is exited, that is, on any interface of the first terminal device, such as a shopping interface, an entertainment interface, a browser interface, an information popularization of science interface, and a combat interface of the virtual role interaction application, and the instant messaging user account corresponding to the target virtual role identifier transmits a reply message for any session message, the instant messaging application receives the reply information. After switching to the instant messaging application, the reply message is displayed on a session interface of the instant messaging user account corresponding to the target virtual role identifier in the instant messaging application. For example, when the game message interaction interface is exited, it is on the shopping interface, and user B transmits a reply message, user A receives the reply message by using WeChat. After switching to WeChat, the reply message transmitted by user B is displayed on the session interface between WeChat and user B. In the foregoing example, user A is the current instant messaging user, user B is the instant messaging user corresponding to the target virtual role, WeChat is the instant messaging application, and the game message interaction interface is the message interaction interface in the virtual role interaction application.

According to the foregoing communication method based on a virtual role interaction interface, when the message interaction interface in the virtual role interaction application is exited, it indicates that a focus of the user is located on another interface such as a combat interface or a shopping interface, and a reply message is received and displayed by using the instant messaging application, which can avoid disturbing normal use of an application such as the virtual role interaction application by the user.

In an embodiment, the communication method based on a virtual role interaction interface further includes: counting a quantity of session messages transmitted to the target instant messaging account when the target instant messaging account corresponding to the target virtual role identifier is a stranger account and a session with the target instant messaging account is the first session; and prohibiting transmitting of the session message again to the target instant messaging account when the counted quantity reaches a preset quantity and no reply message for any session message is received from the target instant messaging account.

The stranger account is an account that is not added as a friend. The first session means that when an instant messaging user A transmits N session messages to another instant messaging user B, and instant messaging user B does not reply, the N messages transmitted by instant messaging user A are all messages in the first session. The quantity of session messages can be counted by using transmitting times. For example, if the session message is transmitted once, the session message is recorded as 1; and if the session message is transmitted twice, the session message is recorded as 2. The preset quantity may be set according to an actual requirement, and may be specifically 1, 2, 3, and the like. This is not limited thereto.

Specifically, when the target instant messaging account corresponding to the target virtual role identifier is a stranger account and the session between the current instant messaging account and the target instant messaging account is the first session, the first terminal device counts a quantity of session messages transmitted to the target instant messaging account. When the quantity of transmitted session messages reaches the preset quantity, and the first terminal device does not receive a reply message from the target instant messaging account for any message transmitted by the current instant messaging account, the first terminal device prohibits transmitting of the session message to the target instant messaging account again. When receiving the reply message from the target instant messaging account for any session message, the first terminal device displays the reply message on the session interface of the instant messaging user account corresponding to the target virtual role identifier in the instant messaging application.

In the foregoing communication method based on a virtual role interaction interface, when the target instant messaging account corresponding to the target virtual role identifier is a stranger account and is the first session, and the quantity of session messages reaches the preset quantity, when no reply message is received, it may be indicated that the user corresponding to the target instant messaging account does not reply to the message, and it is prohibited to transmit a session message to the target instant messaging account again, thereby preventing harassment to the target instant messaging account.

Figure 8A:
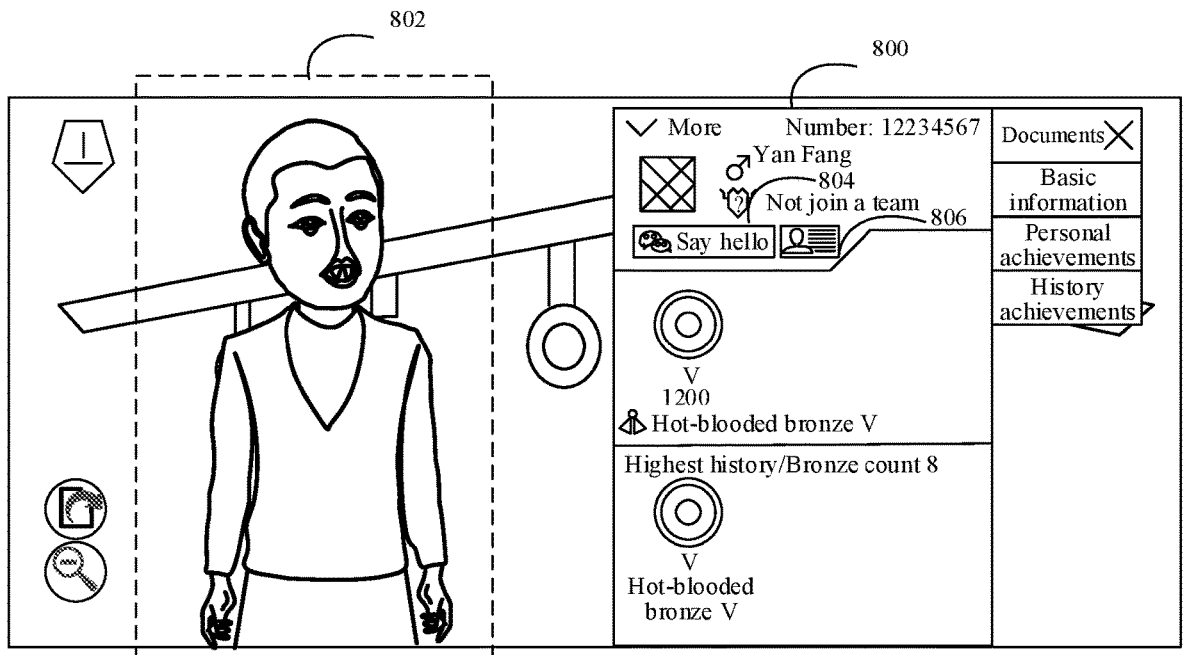
FIG. 8(a) is a schematic interface diagram of a modified user information interface according to an embodiment.
Figure 8B:
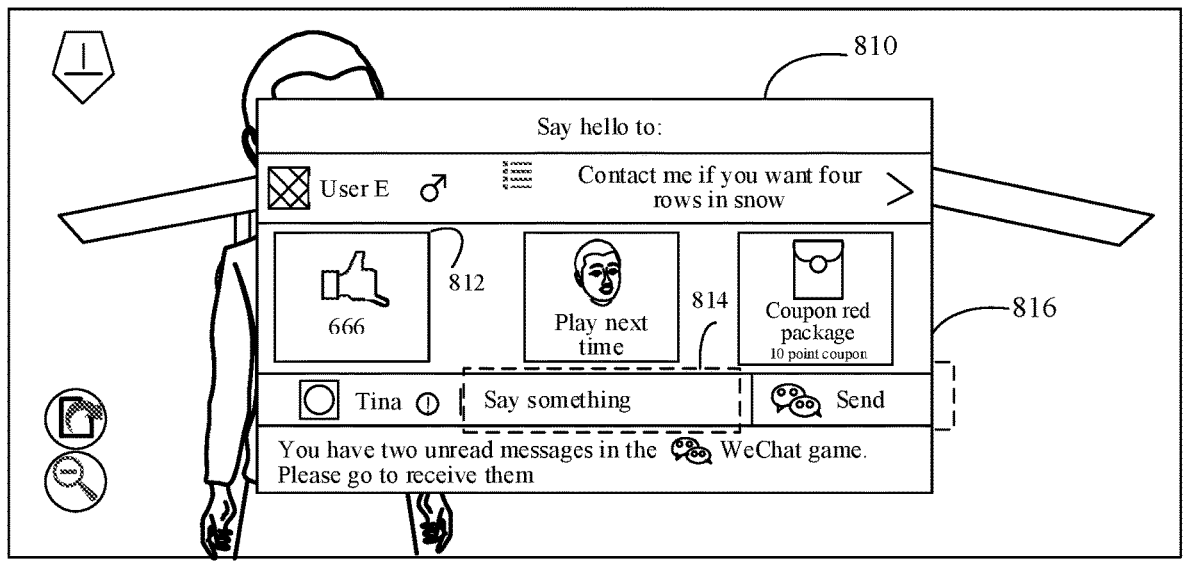
FIG. 8(b) is a schematic interface diagram of a virtual role interaction interface according to another embodiment.
Figure 8C:
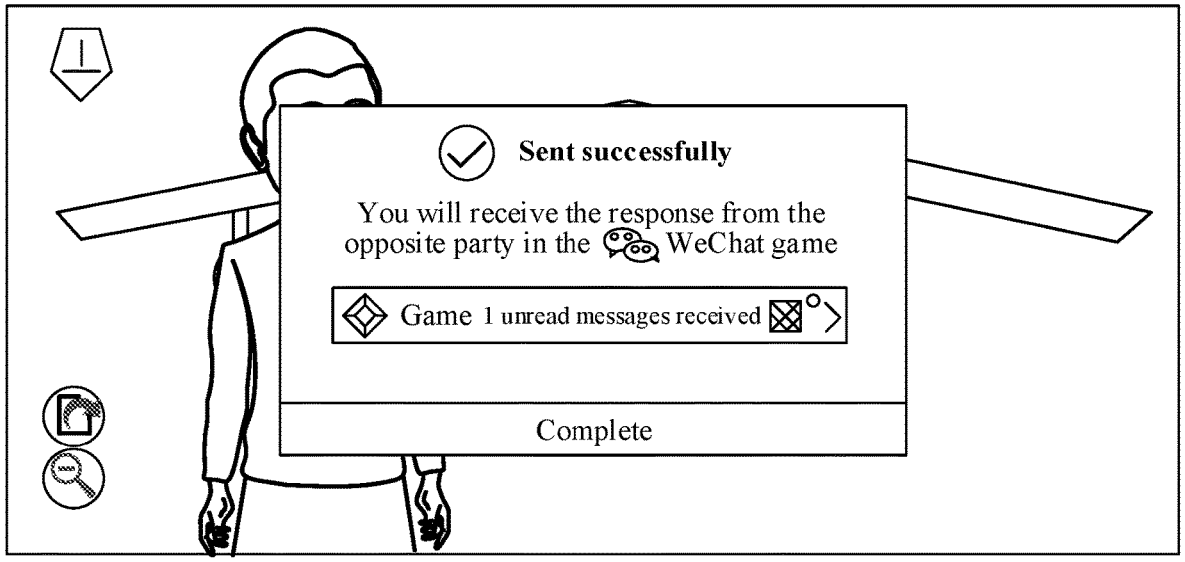
FIG. 8(c) is a schematic interface diagram of successful transmitting on a virtual role interaction interface according to an embodiment.

In an embodiment, FIG. 8(a) is a schematic interface diagram of a virtual role interaction interface according to an embodiment. This includes a virtual role information interface 800, a target virtual role identifier 802, an instant session message triggering control 804, and a user information query operation entry 806. The first terminal device displays a virtual role interface, where the interface includes the target virtual role identifier 802. In response to a trigger operation on the target virtual role identifier 802, the virtual role information interface 800 including the instant session message triggering control 804 and the user information query entry 806 is displayed in the virtual role interaction interface. The virtual role information interface may include a virtual role name such as Yan Fang, a virtual role profile photo, a score of the virtual role in the virtual role interaction interface, such as 1200, and ranking, such as hot-blooded bronze. In response to the trigger operation on the session message triggering control 804, an interface diagram shown in FIG. 8(b) is displayed. FIG. 8(b) is a schematic interface diagram of a virtual role interaction interface according to another embodiment. A message input interface 810 includes a pre-set message 812, a message input area 814, and an instant message transmitting control 816. A text session message may be inputted in the message input area 814. The candidate pre-set message 812 includes 666, play next time, and a coupon red packet (10 point coupon). At least one pre-set message is selected in response to a selection operation on the displayed candidate pre-set message. For example, if the selected message is 666, 666 is a session message inputted in the message input interface. After 666 is selected, the terminal device may directly transmit 666 to an instant messaging user corresponding to the target virtual role identifier 802. Alternatively, after 666 is selected, 666 is transmitted to the instant messaging user corresponding to the target virtual role identifier 802 in response to the instant message transmitting control 816. When the transmitted pre-set message is the coupon red packet in the figure, that is, a prop, the pre-set message is displayed in an instant messaging application to which an instant messaging user corresponding to the target virtual role identifier 802 is logged in. In response to the trigger operation on the displayed pre-set message, the specified prop is bound to the target virtual role identifier 802 in the virtual role interaction interface, and the prop is used by the target virtual role identifier 802 in the virtual role interaction interface. When message prompt information "You have 2 unread messages in the WeChat game. Please go to receive them" is triggered in FIG. 8(b), the WeChat application can be opened. After the message is transmitted successfully, the interface is shown in FIG. 8(c). FIG. 8(c) is a schematic interface diagram of successful transmitting on a virtual role interaction interface according to an embodiment. The figure prompts "You will receive the response from the opposite party in the WeChat game", with some interface diagrams of the WeChat game. That is, FIG. 3(a) is a schematic diagram of some interfaces in this application. In the foregoing communication method based on a virtual role interaction interface, because persons are a sum of social relationships, a social relationship needs to be established and maintained by means of information transmission. Matching to teammates and opponents through the game is a social relationship contact, and this contact ends with the game, information transfer ends, and this social relationship breaks accordingly. Through the WeChat greeting function, the user can re-establish the social relationship on the WeChat side. The communication and interaction brought about by the social relationship will also enhance enthusiasms of players in the game and enhance recognition of using WeChat accounts to log in to the game. A social relationship of a user in a game is precipitated in WeChat client-WeChat game, which increases activity of WeChat game, thereby improving exposure of other services of WeChat game.

Figure 9:
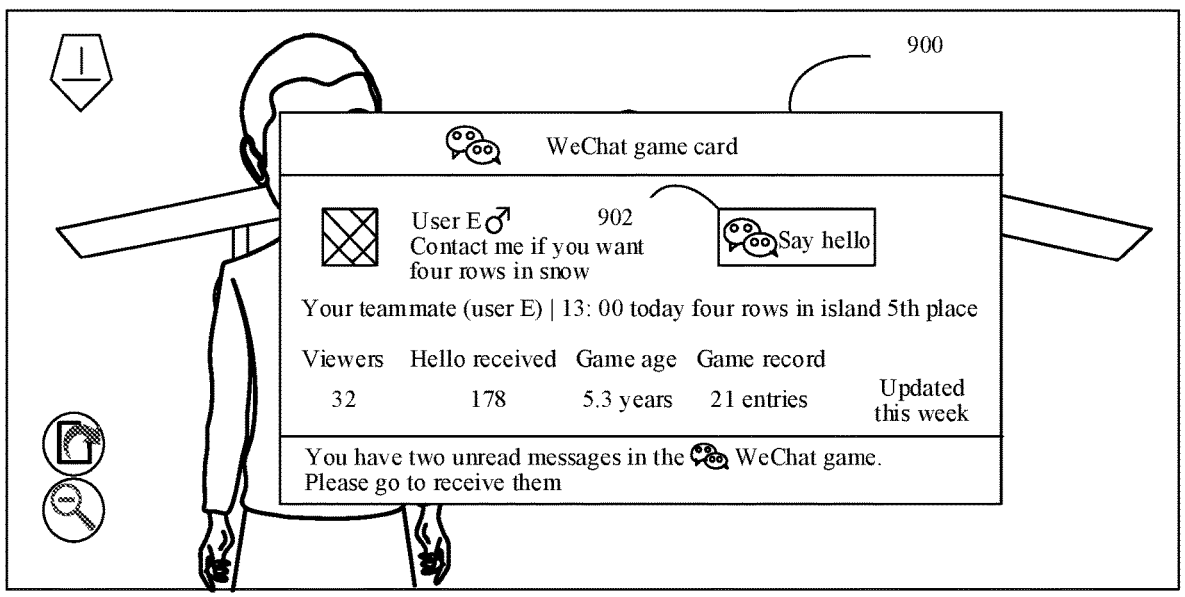
FIG. 9 is a schematic interface diagram of a virtual role interaction interface that includes a user information interface according to an embodiment.

In an embodiment, FIG. 8(a) includes the virtual role information interface 800, the target virtual role identifier 802, and the user information query operation entry 806. In the virtual role interaction interface in response to the trigger operation on the target virtual role identifier 802, the virtual role information interface 800 corresponding to the target virtual role identifier 802 is displayed. In response to a user information query operation triggered by the user information query operation entry 806 of the virtual role information interface 800, a schematic interface diagram of a virtual role interaction interface that includes a user information interface 900 is displayed. FIG. 9 is a schematic interface diagram of a virtual role interaction interface that includes a user information interface according to an embodiment. The user information interface 900 includes an instant session message triggering control 902. In response to a trigger operation on the instant session message triggering control 902, the message input interface 810 in FIG. 8(b) is displayed. After a session message is inputted in the message input interface 810, the session message used for displaying in the instant messaging application is transmitted to the instant messaging user corresponding to the target virtual role 802.

In an embodiment, a communication method based on a virtual role interaction interface includes:

Step (a1): Display an identity information input interface in response to an identity information creation operation triggered on the user information interface of the target instant messaging user.

Step (a2): Acquire content inputted in the identity information input interface.

Step (a3): Set, in response to an identity information confirmation operation triggered on the identity information input interface, the inputted content as the identity information of the target instant messaging user, where the identity information is different from instant messaging identity information of the target instant messaging user, and is also different from role information of the virtual role corresponding to the target instant messaging user in the virtual role interaction interface.

Step (a4): Display a virtual role interaction interface of a virtual role interaction application, the virtual role interaction interface including a target virtual role identifier.

Step (a5): Display, in the virtual role interaction interface in response to the trigger operation on the target virtual role identifier, a virtual role information interface corresponding to the target virtual role identifier.

Step (a6): Display a user information interface in response to a user information query operation triggered on the virtual role information interface.

Step (a7): Display, on the user information interface, user information of the instant messaging user corresponding to the target virtual role identifier, and displaying an instant session message triggering control.

Step (a8): Display a message input interface in response to a trigger operation on the instant session message triggering control.

Step (a9): Display a candidate pre-set message on the message input interface.

Step (a10): Select at least one pre-set message in response to a selection operation on a displayed candidate pre-set message.

Step (a11): Determine the selected pre-set message as a session message inputted in the message input interface.

Step (a12): After a session message is inputted in the message input interface, acquire the target virtual role account.

Step (a13): Transmit the target virtual role account and the session message to an instant messaging server by using the instant messaging component, so that the instant messaging server queries a target instant messaging account corresponding to the target virtual role account, and transmits the session message based on the target instant messaging account.

Step (a14): Display the session message on the instant messaging application logged in by using the instant messaging user corresponding to the target virtual role identifier.

Step (a15): Bind, in response to a trigger operation on the displayed session message, a prop specified in the session message to the target virtual role identifier in the virtual role interaction interface, the prop being to be used by the target virtual role identifier in the virtual role interaction interface.

Step (a16): Count a quantity of session messages transmitted to the target instant messaging account when the target instant messaging account corresponding to the target virtual role identifier is a stranger account and a session with the target instant messaging account is the first session.

Step (a17): Prohibit transmitting of the session message again to the target instant messaging account when the counted quantity reaches a preset quantity and no reply message for any session message is received from the target instant messaging account.

Step (a18): Display a function interface of the instant messaging application.

Step (a19): Display, on the function interface, a session list entry of a session triggered by the virtual role interaction interface.

Step (a20): Display a session list in response to a trigger operation on the session list entry, the session list including the session triggered by using the virtual role interaction interface.

Step (a21): Select, in response to a session selection operation triggered in the session list, a target session with a target instant messaging user from the session list, and enter a session interface of the target session.

Step (a22): Display, in a virtual role-related information display area of the session interface, related information of a virtual role corresponding to the target instant messaging user in the virtual role interaction interface.

Step (a23): Enter a user information interface of the target instant messaging user in response to a user information viewing operation triggered on the session interface.

Step (a24): Display identity information of the target instant messaging user on the user information interface, and display interface information of a virtual role interaction interface associated with the target instant messaging user.

Step (a25): Subscribe, in response to a subscription operation triggered on the session interface for the interface information, to content that is published by the target instant messaging user and that is related to an associated virtual role interaction interface.

Step (a26): Display a message interaction interface in the virtual role interaction application in the virtual role interaction interface.

Step (a27): Display, when a reply message transmitted by the target instant messaging user corresponding to the target virtual role identifier for any session message is received, the reply message on the message interaction interface.

Step (a28): Receive a reply message by using the instant messaging application when the message interaction interface in the virtual role interaction application is exited, and the instant messaging user corresponding to the target virtual role identifier transmits the reply message for any session message.

Step (a29): Display, after switching to the instant messaging application, the reply message on a session interface of the instant messaging user corresponding to the target virtual role identifier in the instant messaging application.

Although the foregoing steps are sequentially displayed according to an indication of numbers, the steps are not necessarily sequentially performed according to the indication of numbers. Unless clearly specified in this specification, there is no strict sequence limitation on the execution of the steps, and the steps may be performed in another sequence. These steps or stages are not necessarily executed at the same time, but may be executed at different times. The order of execution of these steps or stages is not necessarily performed sequentially, but may be performed in turn or alternately with other steps or at least a part of steps or stages of other steps.

In the foregoing communication method based on a virtual role interaction interface, the identity information can be set to prevent disturbance. The instant session message triggering control is displayed by performing a trigger operation on the target virtual role identifier, that is, the message triggering control that connects the virtual role interaction application to the instant messaging application is provided in the virtual role interaction interface. A trigger operation is performed on the session message triggering control, and a session message is transmitted to the instant messaging user corresponding to the target virtual role identifier. Therefore, after the virtual role interaction interface is disabled, chatting with the instant messaging user corresponding to the virtual role can be performed. Content that is related to the associated virtual role interaction interface and that is published by the target instant messaging user can be subscribed to. Communication efficiency and interaction between applications can be improved by keeping in contact with the virtual role transmitting a session message by using the instant messaging application, user retention rates of the virtual role interaction interface and the instant messaging application can be increased, and exposure of other related functions of the virtual role interaction interface and the instant messaging application can be improved. When the user focuses on the message interaction interface of the virtual role interaction application, a message is displayed on the message interaction interface, and the message can be quickly acquired. When the user exits the message interaction interface, the message is received by using the instant messaging application and displayed on the session interface, which can not affect the user's normal use of the application.

In an embodiment, a current intra-game team is limited to being in a combat period, and communication cannot be performed outside the combat period. Currently, the following methods can be used for communication after the game, but are not perfect: 1. Players actively exchanges contact manners in the game, including but not limited to a WeChat account, and then maintain communication after the game by actively adding a WeChat account and creating a group. 2. The player applies for adding a teammate as a game friend on the settlement page when the game ends, and then communicates in the game. In the foregoing manner, the user needs to perform an operation for applying for adding a friend/team during a combat or on the settlement page. Not only operations are cumbersome, but also a probability of finding a teammate is very low once the game ends, resulting in low communication efficiency. This application provides an application interface, and the application interface applies the foregoing communication method based on a virtual role interaction interface. Specifically, game role A is a current virtual role identifier, game role B is a target virtual role identifier, user A is a current instant messaging user, user B is a target instant messaging user, WeChat is an instant messaging application, a game interface is a virtual role interaction interface, a WeChat greeting control is an instant session message triggering control, a target game account is a target virtual role account, and a target WeChat account is a target instant messaging account. Application of the communication method based on a virtual role interaction interface in the application interface is as follows:

Display an identity information input interface in response to an identity information creation operation triggered on a user information interface of WeChat user B. Acquire content inputted in the identity information input interface of WeChat user B. Set, in response to an identity information confirmation operation triggered on the identity information input interface, the inputted content as the identity information of WeChat user B, where the identity information is different from instant messaging identity information of WeChat user B, and is also different from role information of the virtual role corresponding to WeChat user B in the game interface. Display the game interface including game role B. Display, in the game interface in response to a trigger operation on game role B by game role A, a virtual role information interface corresponding to game role B. Display a user information interface in response to a user information query operation triggered on the virtual role information interface by game role A. Display, on the user information interface, user information of the instant messaging user corresponding to game role B, and display the WeChat greeting control. Display a message input interface in response to a trigger operation on the WeChat greeting control. Display a candidate pre-set message on the message input interface. Select at least one pre-set message in response to a selection operation on a displayed candidate pre-set message by game role A. Determine the selected pre-set message as a session message inputted in the message input interface. After a session message is inputted in the message input interface, acquire a target game account of game role B. Transmit the target game account and the session message to a WeChat server by using a WeChat component, so that the WeChat server queries a target WeChat account corresponding to the target game account, and transmits the session message based on the target WeChat account. Display a message interaction interface in the game in the game interface. Display, when a reply message transmitted by WeChat user B corresponding to virtual role B for any session message is received, the reply message on the message interaction interface. Receive a reply message by using the WeChat application when the message interaction interface in the game is exited, and WeChat user B transmits the reply message for any session message. After switching to the WeChat application, display the reply message on the session interface with WeChat user B in the WeChat application. Display the session message in WeChat to which WeChat user B corresponding to game role B is logged in. Bind, in response to a trigger operation on the displayed session message, a prop specified in the session message to game role B in the game interface, the prop being to be used by game role B in the game interface. Count a quantity of session messages transmitted to the target WeChat account when the target WeChat account corresponding to game role B is a stranger account and a session with the target WeChat account is the first session. Prohibit transmitting of the session message again to the target WeChat account when the counted quantity reaches a preset quantity and no reply message for any session message is received by WeChat user A from the target WeChat account. Display a function interface of WeChat. Display, on the function interface of WeChat, a session list entry of a session triggered by the game interface. Display a session list in response to a trigger operation on the session list entry, the session list including the session triggered by using the game interface. Select, in response to a session selection operation triggered in the session list, a target session with WeChat user B from the session list, and enter a session interface of the target session. Display, in a virtual role-related information display area of the session interface, related information of a virtual role corresponding to WeChat user B in the game interface. Enter a user information interface of WeChat user B in response to a user information viewing operation triggered on the session interface. Display identity information of WeChat user B on the user information interface, and display interface information of a game interface associated with WeChat user B. Subscribe, in response to a subscription operation triggered on the session interface for the interface information, to content that is published by WeChat user B and that is related to the associated game interface.

This application further provides an application interface, and the application interface applies the foregoing communication method based on a virtual role interaction interface. Specifically, learning exchange role A is a current virtual role identifier, learning exchange role B is a target virtual role identifier, WeChat user A is a current instant messaging user, WeChat user B is a target instant messaging user, WeChat is an instant messaging application, a learning exchange virtual interface is a virtual role interaction interface, a WeChat greeting control is an instant session message triggering control, a target learning exchange account is a target virtual role account, and a target WeChat account is a target instant messaging account. Application of the communication method based on a virtual role interaction interface in the application interface is as follows:

Display an identity information input interface in response to an identity information creation operation triggered on a user information interface of WeChat user B. Acquire content inputted in the identity information input interface of WeChat user B. Set, in response to an identity information confirmation operation triggered on the identity information input interface, the inputted content as the identity information of WeChat user B, where the identity information is different from instant messaging identity information of WeChat user B, and is also different from role information of the virtual role corresponding to WeChat user B in the learning exchange virtual interface. Display the learning exchange virtual interface, which includes learning exchange role B. Display, in the learning exchange virtual interface in response to a trigger operation on learning exchange role B by learning exchange role A, a virtual role information interface corresponding to learning exchange role B. Display a user information interface in response to a user information query operation triggered on the virtual role information interface by learning exchange role A. Display, on the user information interface, user information of the instant messaging user corresponding to learning exchange role B, and display the WeChat greeting control. Display a message input interface in response to a trigger operation on the WeChat greeting control. Display a candidate pre-set message on the message input interface. Select at least one pre-set message in response to a selection operation on a displayed candidate pre-set message by learning exchange role A. Determine the selected pre-set message as a session message inputted in the message input interface. After a session message is inputted in the message input interface, acquire a target learning exchange account of learning exchange role B. Transmit the target learning exchange account and the session message to an instant messaging server by using the instant messaging component, so that the instant messaging server queries a target WeChat account corresponding to the target learning exchange account, and transmits the session message based on the target WeChat account. Display a message interaction interface in learning exchange in the learning exchange interface. Display, when a reply message transmitted by WeChat user B corresponding to virtual role B for any session message is received, the reply message on the message interaction interface. Receive a reply message by using the WeChat application when the message interaction interface in learning exchange is exited, and WeChat user B transmits the reply message for any session message. After switching to the WeChat application, display the reply message on the session interface with WeChat user B in the WeChat application. Display the session message in WeChat to which the instant messaging user corresponding to learning exchange role B is logged in. Bind, in response to a trigger operation on the displayed session message, a prop specified in the session message to learning exchange role B in the learning exchange virtual interface, the prop being to be used by learning exchange role B in the learning exchange virtual interface. Count a quantity of session messages transmitted to the target WeChat account when the target WeChat account corresponding to learning exchange role B is a stranger account and a session with the target WeChat account is the first session. Prohibit transmitting of the session message again to the target WeChat account when the counted quantity reaches a preset quantity and no reply message for any session message is received by WeChat user A from the target WeChat account. Display a function interface of WeChat. Display, on the function interface of WeChat, a session list entry of a session triggered by the learning exchange virtual interface. Display a session list in response to a trigger operation on the session list entry, the session list including the session triggered by using the learning exchange virtual interface. Select, in response to a session selection operation triggered in the session list, a target session with WeChat user B from the session list, and enter a session interface of the target session. Display, in a virtual role-related information display area of the session interface, related information of a virtual role corresponding to WeChat user B in the learning exchange virtual interface. Enter a user information interface of WeChat user B in response to a user information viewing operation triggered on the session interface. Display identity information of WeChat user B on the user information interface, and display interface information of a learning exchange virtual interface associated with WeChat user B. Subscribe, in response to a subscription operation triggered on the session interface for the interface information, to content that is published by WeChat user B and that is related to the associated learning exchange virtual interface.

It is to be understood that, although each step of the flowcharts in FIG. 2 and FIG. 5 is displayed sequentially according to arrows, the steps are not necessarily performed according to an order indicated by arrows. Unless clearly specified in this specification, there is no strict sequence limitation on the execution of the steps, and the steps may be performed in another sequence. In addition, at least some steps in FIG. 2 and FIG. 5 may include a plurality of steps or a plurality of stages. The steps or the stages are not necessarily performed at the same moment, and instead may be performed at different moments. A performing sequence of the steps or the stages is not necessarily performed in sequence, and instead may be performed in turn or alternately with another step or at least some of steps or stages of the another step.

Figure 10:
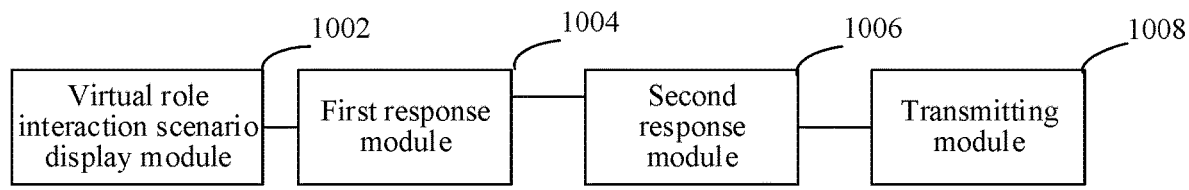
FIG. 10 is a structural block diagram of a communication apparatus based on a virtual role interaction interface according to an embodiment.

In an embodiment, FIG. 10 is a structural block diagram of a communication apparatus based on a virtual role interaction interface according to an embodiment. As shown in FIG. 10, a communication apparatus based on a virtual role interaction interface is provided. The apparatus may be a software module or a hardware module, or a combination thereof as a part of a computer device. The apparatus specifically includes a virtual role interaction interface display module 1002, a first response module 1004, a second response module 1006, and a transmitting module 1008.

The virtual role interaction interface display module 1002 is configured to display a virtual role interaction interface of a virtual role interaction application, the virtual role interaction interface including a target virtual role identifier.

The first response module 1004 is configured to: display an instant session message triggering control on the virtual role interaction interface in response to a trigger operation on the target virtual role identifier.

The second response module 1006 is configured to display a message input interface in response to a trigger operation on the instant session message triggering control.

The transmitting module 1008 is configured to: transmit, to an instant messaging user account corresponding to the target virtual role identifier after a session message is inputted in the message input interface, the session message used for displaying on an instant messaging application.

In the foregoing communication apparatus based on a virtual role interaction interface, the instant session message triggering control is displayed by performing a trigger operation on the target virtual role identifier, that is, the message triggering control that connects the virtual role interaction interface to the instant messaging application is provided in the virtual role interaction interface. A trigger operation is performed on the session message triggering control, and a session message is transmitted to the instant messaging user corresponding to the target virtual role identifier. Therefore, after the virtual role interaction interface is disabled, chatting with the instant messaging user corresponding to the virtual role can be performed, communication efficiency can be improved, interaction between applications can be improved, user retention rates of the virtual role interaction interface and the instant messaging application can be increased, and exposure of other related functions of the virtual role interaction interface and the instant messaging application can be improved.

In an embodiment, the communication apparatus based on a virtual role interaction interface includes a session display module of an instant messaging application, and the session display module of the instant messaging application is configured to display a function interface of the instant messaging application; display, on the function interface, a session list entry of a session triggered by the virtual role interaction interface; and display a session list in response to a trigger operation on the session list entry, the session list including the session triggered by using the virtual role interaction interface.

In the foregoing communication apparatus based on a virtual role interaction interface, a session list entry of a session triggered by the virtual role interaction interface is displayed on the function interface of the instant messaging application, and a session triggered by the virtual role interaction interface is displayed, so that a session message transmitted by the instant messaging user corresponding to the virtual role can be received in the instant messaging application, thereby improving communication efficiency. In addition, because a session is entered from the session list entry of the function interface, a session between the current instant messaging user and a friend is distinguished from a session between the current instant messaging user and a net friend, so that the session between the current instant messaging user and the friend is not affected, a real life is distinguished from the virtual interface, and disturbance can be prevented.

In an embodiment, the session display module of the instant messaging application is configured to: select, in response to a session selection operation triggered in the session list, a target session with a target instant messaging user account from the session list, and enter a session interface of the target session; and display, in a virtual role-related information display area of the session interface, related information of a virtual role corresponding to the target instant messaging user account in the virtual role interaction interface.

In the foregoing communication apparatus based on a virtual role interaction interface, the session interface of the target session with the target instant messaging user is entered in the virtual role interaction interface. Because the user may forget a role of transmitting a session message, the virtual role-related information display area displays the related information of the virtual role corresponding to the target instant messaging user in the virtual role interaction interface, so that the user can more intuitively learn of an identity of the instant messaging user in the virtual role interaction interface, and communication efficiency is improved.

In an embodiment, the session display module of the instant messaging application is configured to: enter a user information interface of the target instant messaging user account in response to a user information viewing operation triggered on the session interface; display identity information of the target instant messaging user account on the user information interface, and display interface information of a virtual role interaction interface associated with the target instant messaging user account; and subscribe, in response to a subscription operation triggered on the session interface for the interface information, to content that is published by the target instant messaging user account and that is related to an associated virtual role interaction interface.

In the foregoing communication apparatus based on a virtual role interaction interface, the identity information of the target instant messaging user is displayed on the identity information interface, the interface information of the virtual role interaction interface associated with the target instant messaging user is displayed, the content related to the associated virtual role interaction interface and published by the target instant messaging user can be subscribed, and a virtual role for transmitting a session message can be kept in contact by using the instant messaging application, thereby improving communication efficiency.

In an embodiment, the identity information is different from instant messaging identity information of the target instant messaging user account, and is also different from role information of the virtual role corresponding to the target instant messaging user account in the virtual role interaction interface.

In the foregoing communication apparatus based on a virtual role interaction interface, if the identity information is different from the instant messaging user information and the role information of the virtual role, the identity information of the target instant messaging user is distinguished from the instant messaging user information and the role information, personal privacy can be protected, and disturbance can be prevented.

In an embodiment, the communication apparatus based on a virtual role interaction interface further includes an identity setting module, where the identity setting module is configured to display an identity information input interface in response to an identity information creation operation triggered on the user information interface of the target instant messaging user account; acquire content inputted in the identity information input interface; and set, in response to an identity information confirmation operation triggered on the identity information input interface, the inputted content as the identity information of the target instant messaging user account.

According to the foregoing communication apparatus based on a virtual role interaction interface, content is inputted in the identity information input interface, and the inputted content is set as the identity information of the target instant messaging user, so that the identity information is different from the instant messaging user information and the role information of the virtual role. Therefore, the identity information of the target instant messaging user is distinguished from the instant messaging user information and the role information, and disturbance can be prevented.

In an embodiment, the first response module 1004 is configured to display, in the virtual role interaction interface in response to the trigger operation on the target virtual role identifier, a virtual role information interface corresponding to the target virtual role identifier; display a user information interface in response to a user information query operation triggered on the virtual role information interface; and display, on the user information interface, user information of the instant messaging user account corresponding to the target virtual role identifier, and display an instant session message triggering control.

In the foregoing communication apparatus based on a virtual role interaction interface, in response to the user information query operation triggered in the virtual role information interface, the user information interface is displayed, the user information of the instant messaging user corresponding to the target virtual role identifier is displayed in the user information interface, and the instant session message control is displayed, so that some user information in the instant messaging application can be displayed in the virtual role interaction interface, thereby improving interaction between applications.

In an embodiment, the second response module 1006 is configured to display a candidate pre-set message on the message input interface; select at least one pre-set message in response to a selection operation on a displayed candidate pre-set message; and determine the selected pre-set message as a session message inputted in the message input interface.

In the foregoing communication apparatus based on a virtual role interaction interface, a candidate pre-set message is displayed on the message input interface. In response to a selection operation on the displayed pre-set message, a pre-set message is selected, and the selected pre-set message is determined as an inputted session message, so that the session message can be quickly transmitted to the instant messaging user corresponding to the target virtual role identifier, thereby improving communication efficiency.

In an embodiment, the second response module 1006 is configured to display the session message on the instant messaging application logged in by using the instant messaging user account corresponding to the target virtual role identifier; and bind, in response to a trigger operation on the displayed session message, a prop specified in the session message to the target virtual role identifier in the virtual role interaction interface, the prop being to be used by the target virtual role identifier in the virtual role interaction interface.

In the foregoing communication apparatus based on a virtual role interaction interface, a prop specified in a session message is bound to the target virtual role identifier in the virtual role interaction interface, so that the prop can be presented on the virtual role interaction interface, so that the target virtual role identifier receives and uses the prop, and interaction and communication efficiency between virtual roles is improved.

In an embodiment, the virtual role interaction application corresponding to the virtual role interaction interface includes an instant messaging component of the instant messaging application; and the transmitting module 1008 is configured to transmit, by using the instant messaging component through a communication channel of the instant messaging application, the session message used for displaying in the instant messaging application to the instant messaging user account corresponding to the target virtual role identifier.

In the foregoing communication apparatus based on a virtual role interaction interface, the instant messaging component transmits, to the instant messaging user corresponding to the target virtual role identifier by using the communication channel of the instant messaging application, a session message used for displaying in the instant messaging application, without needing to transmit the message after jumping to the instant messaging application, so that the session message can be directly transmitted in the virtual role interaction interface, thereby improving communication efficiency.

In an embodiment, the transmitting module 1008 is configured to acquire a target virtual role account; and
    transmit the target virtual role account and the session message to an instant messaging server by using the instant messaging component, so that the instant messaging server queries a target instant messaging account corresponding to the target virtual role account, and transmits the session message based on the target instant messaging account.

In the foregoing communication apparatus based on a virtual role interaction interface, the target virtual role account and the session message are transmitted to the instant messaging server by using the instant messaging component, so that the instant messaging server queries the target instant messaging account corresponding to the target virtual role account, and transmits the session message based on the target instant messaging account, so that a session with a stranger can be implemented in the virtual role interaction interface, thereby improving communication efficiency.

In an embodiment, the virtual role interaction interface display module 1002 is configured to display a message interaction interface in the virtual role interaction application in the virtual role interaction interface; and display, when a reply message transmitted by the target instant messaging user account corresponding to the target virtual role identifier for any session message is received, the reply message on the message interaction interface.

In the foregoing communication apparatus based on a virtual role interaction interface, when a reply message transmitted by the target virtual role identifier is received on the message interaction interface, the reply message is directly displayed on the message interaction interface, that is, when the user stays on the message interaction interface of the virtual role interaction application, the reply message may be directly displayed on the message interaction interface, thereby improving message acquiring efficiency and improving communication efficiency.

In an embodiment, the communication apparatus based on a virtual role interaction interface includes a session display module of an instant messaging application, and the session display module of the instant messaging application is configured to: when the message interaction interface corresponding to the virtual role interaction interface is exited, and the instant messaging user account corresponding to the target virtual role identifier transmits a reply message for any session message, receive the reply message by using the instant messaging application; and display, after switching from the virtual role interaction application to the instant messaging application, the reply message on a session interface of the instant messaging user account corresponding to the target virtual role identifier in the instant messaging application.

According to the foregoing communication apparatus based on a virtual role interaction interface, when the message interaction interface in the virtual role interaction application is exited, it indicates that a focus of the user is located on another interface such as a combat interface or a shopping interface, and a reply message is received and displayed by using the instant messaging application, which can avoid disturbing normal use of an application such as the virtual role interaction application by the user.

In an embodiment, the transmitting module 1008 is further configured to: count a quantity of session messages transmitted to the target instant messaging account when the target instant messaging account corresponding to the target virtual role identifier is a stranger account and a session with the target instant messaging account is the first session; and prohibit transmitting of the session message again to the target instant messaging account when the counted quantity reaches a preset quantity and no reply message for any session message is received from the target instant messaging account.

In the foregoing communication apparatus based on a virtual role interaction interface, when the target instant messaging account is a stranger account and is the first session, and the quantity of session messages reaches the preset quantity, when no reply message is received, it may be indicated that the user corresponding to the target instant messaging account does not reply to the message, and it is prohibited to transmit a session message to the target instant messaging account again, thereby preventing harassment to the target instant messaging account.

For a specific limitation on the communication apparatus based on a virtual role interaction interface, refer to the foregoing limitation on the communication method based on a virtual role interaction interface. Details are not described herein again. All modules in the foregoing communication apparatus based on a virtual role interaction interface may be implemented in whole or in part by using software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a terminal device, and an internal structure diagram thereof may be shown in FIG. 11. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless communication may be implemented by WIFI, an operator network, NFC (Near Field Communication), or other technologies. The computer program is executed by the processor to implement the communication method based on a virtual role interaction interface. The display screen of the computer device may be a liquid crystal display or an electronic ink display screen. The input device of the computer device may be a touch layer that overlays the display screen, or may be a key, a trackball, or a touchpad disposed on the chassis of the computer device, or may be an external keyboard, touchpad or mouse or the like.

Figure 11:
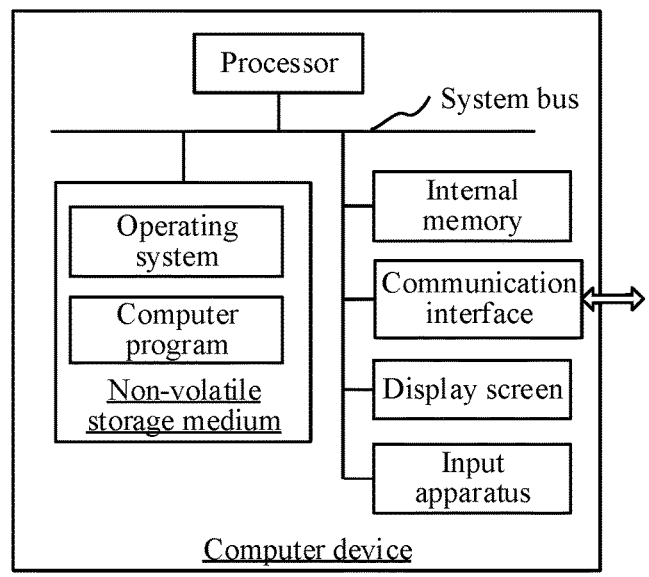
FIG. 11 is an internal structural diagram of a computer device according to an embodiment.

A person skilled in the art may understand that, the structure shown in FIG. 11 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is further provided, including a memory and one or more processors, where the memory stores computer readable instructions, and when the computer readable instructions are executed by the processor, the one or more processors perform the steps of the foregoing method embodiments.

In an embodiment, one or more non-volatile readable storage media that store computer readable instructions are provided. When one or more processors execute the computer readable instructions, the one or more processors perform the steps in the foregoing method embodiments.

In an embodiment, a computer program product or a computer program is provided. The computer program product or the computer program includes a computer instruction. The computer instruction is stored in a computer-readable storage medium. The processor of the computer device reads the computer instruction from the computer-readable storage medium. The processor executes the computer instruction to cause the computer device to perform the steps of the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiment may be randomly combined. For concise description, not all possible combinations of the technical features in the embodiments are described. However, provided that combinations of the technical features do not conflict with each other, the combinations of the technical features are considered as falling within the scope described in this specification.

What is claimed is:

1. A communication method based on a virtual role interaction interface, performed by a first terminal device, the communication method comprising:
   displaying a virtual role interaction interface of a virtual role interaction application, the virtual role interaction interface comprising a target virtual role identifier, the virtual role interaction application being separate from a first instant messaging application bound to a current virtual role identifier and an instant messaging application bound to the target virtual role identifier;
   displaying a virtual role information interface on the virtual role interaction interface in response to a trigger operation on the target virtual role identifier, the virtual role information interface comprising a first instant session message triggering control and a user information query operation entry;
   displaying a message input interface in response to a first trigger operation on the first instant session message triggering control;
   displaying a user information interface in response to a user information query operation triggered on the user information query operation entry, the user information interface comprising user information of a target instant messaging user account corresponding to the target virtual role identifier and a second instant session message triggering control;
   displaying the message input interface in response to a second trigger operation on the second instant session message triggering control in the user information interface;
   acquiring, in response to the instant messaging application bound to the target virtual role identifier being different from the first instant messaging application bound to the current virtual role identifier, a current instant messaging user account of a second instant messaging application corresponding to the first instant messaging application bound to the current virtual role identifier, the second instant messaging application being the same as the instant messaging application bound to the target virtual role identifier; and
   transmitting, after a session message is inputted in the message input interface, the session message used for displaying on the instant messaging application bound to the target virtual role identifier from the current instant messaging user account to the target instant messaging user account corresponding to the target virtual role identifier.

2. The method according to claim 1, wherein the method further comprises:
   displaying a function interface of the instant messaging application;
   displaying, on the function interface, a session list entry of a session triggered by the virtual role interaction interface; and
   displaying a session list in response to a trigger operation on the session list entry, the session list comprising the session triggered by using the virtual role interaction interface.

3. The method according to claim 2, wherein the method further comprises:
   selecting, in response to a session selection operation triggered in the session list, a target session with the target instant messaging user account from the session list to enter a session interface of the target session; and
   displaying, in a virtual role-related information display area of the session interface, information related to a virtual role corresponding to the target instant messaging user account in the virtual role interaction interface.

4. The method according to claim 3, wherein the method further comprises:
   entering a user information interface of the target instant messaging user account in response to a user information viewing operation triggered on the session interface;
   displaying identity information of the target instant messaging user account on the user information interface, and displaying interface information of a virtual role interaction interface associated with the target instant messaging user account; and
   subscribing, in response to a subscription operation triggered on the session interface for the interface information, to content published by the target instant messaging user account and related to an associated target interaction interface.

5. The method according to claim 4, wherein the identity information is different from instant messaging identity information of the target instant messaging user account, and the identity information is different from role information of the virtual role corresponding to the target instant messaging user account in the virtual role interaction interface.

6. The method according to claim 4, wherein the identity information is generated by using an identity information setting operation, and the identity information setting operation comprises:
   displaying an identity information input interface in response to an identity information creation operation triggered on the user information interface of the target instant messaging user account;
   acquiring content inputted in the identity information input interface; and
   setting, in response to an identity information confirmation operation triggered on the identity information input interface, the inputted content as the identity information of the target instant messaging user account.

7. The method according to claim 1, wherein the method further comprises:
   displaying a candidate pre-set message on the message input interface;
   selecting at least one pre-set message in response to a selection operation on a displayed candidate pre-set message; and
   determining the selected pre-set message as a session message inputted in the message input interface.

8. The method according to claim 7, wherein the method further comprises:
   displaying the session message on the instant messaging application logged in by using the target instant messaging user account corresponding to the target virtual role identifier; and
   binding, in response to a trigger operation on the displayed session message, a prop specified in the session message to the target virtual role identifier in the virtual role interaction interface, the prop being to be used by the target virtual role identifier in the virtual role interaction interface.

9. The method according to claim 1, wherein transmitting the session message used for displaying on the instant messaging application to the target instant messaging user account corresponding to the target virtual role identifier, comprises:
   transmitting, through a communication channel of the instant messaging application, the session message used for displaying in the instant messaging application to the target instant messaging user account corresponding to the target virtual role identifier.

10. The method according to claim 1, wherein the method further comprises:
    displaying a message interaction interface in the virtual role interaction application in the virtual role interaction interface; and
    displaying, when a reply message transmitted by the target instant messaging user account corresponding to the target virtual role identifier for any session message is received, the reply message on the message interaction interface.

11. The method according to claim 10, wherein the method further comprises:
    receiving a reply message by using the instant messaging application when the message interaction interface in the virtual role interaction application is exited, and the target instant messaging user account corresponding to the target virtual role identifier transmits the reply message for any session message; and
    displaying, after switching to the instant messaging application, the reply message on a session interface of the target instant messaging user account corresponding to the target virtual role identifier in the instant messaging application.

12. The method according to claim 1, wherein the method further comprises:
    counting a quantity of session messages transmitted to the target instant messaging user account when the target instant messaging user account corresponding to the target virtual role identifier is a stranger account and a session with the target instant messaging user account is a first session; and
    prohibiting transmitting of the session message again to the target instant messaging user account when the counted quantity reaches a preset quantity and no reply message for any session message is received from the target instant messaging user account.

13. The method according to claim 1, wherein transmitting the session message to the target instant messaging user account comprises:
    acquiring a target virtual role account of the target virtual role identifier; and
    transmitting the target virtual role account with the session message to an instant messaging server for the instant messaging server to perform a query with the target virtual role account to identify the target instant messaging user account corresponding to the target virtual role account of the target virtual role identifier and transmit the session message based on the target instant messaging user account, wherein the target virtual role account and the target instant messaging user account are separate accounts and the instant messaging server stores a mapping relationship between the target virtual role account and the target instant messaging user account used for the query.

14. A computer device, comprising a memory and one or more processors, the memory storing computer readable instructions, when executed by the processor, causing the computer device to perform steps comprising:
    displaying a virtual role interaction interface of a virtual role interaction application, the virtual role interaction interface comprising a target virtual role identifier, the virtual role interaction application being separate from a first instant messaging application bound to a current virtual role identifier and an instant messaging application bound to the target virtual role identifier;
    displaying a virtual role information interface on the virtual role interaction interface in response to a trigger operation on the target virtual role identifier, the virtual role information interface comprising a first instant session message triggering control and a user information query operation entry;
    displaying a message input interface in response to a first trigger operation on the first instant session message triggering control; and
    displaying a user information interface in response to a user information query operation triggered on the user information query operation entry, the user information interface comprising user information of a target instant messaging user account corresponding to the target virtual role identifier and a second instant session message triggering control;

displaying the message input interface in response to a second trigger operation on the second instant session message triggering control in the user information interface;

acquiring, in response to the instant messaging application bound to the target virtual role identifier being different from the first instant messaging application bound to the current virtual role identifier, a current instant messaging user account of a second instant messaging application corresponding to the first instant messaging application bound to the current virtual role identifier, the second instant messaging application being the same as the instant messaging application bound to the target virtual role identifier; and transmitting, after a session message is inputted in the message input interface, the session message used for displaying on the instant messaging application bound to the target virtual role identifier from the current instant messaging user account to the target instant messaging user account corresponding to the target virtual role identifier.

15. The computer device according to claim 14, wherein the computer device is caused to display the instant session message triggering control on the virtual role interaction interface in response to the trigger operation on the target virtual role identifier by:

displaying, in the virtual role interaction interface in response to the trigger operation on the target virtual role identifier, a virtual role information interface corresponding to the target virtual role identifier;

displaying a user information interface in response to a user information query operation triggered on the virtual role information interface; and displaying, on the user information interface, user information of the target instant messaging user account corresponding to the target virtual role identifier, and displaying an instant session message triggering control.

16. The computer device of claim 14, wherein the computer device is caused to transmit the session message used for displaying on the instant messaging application to the target instant messaging user account corresponding to the target virtual role identifier by:

transmitting, through a communication channel of the instant messaging application, the session message used for displaying in the instant messaging application to the target instant messaging user account corresponding to the target virtual role identifier.

17. A non-transitory computer-readable storage medium storing computer readable instructions, when executed by one or more processors, causing the one or more processors to perform steps comprising:

displaying a virtual role interaction interface of a virtual role interaction application, the virtual role interaction interface comprising a target virtual role identifier, the virtual role interaction application being separate from a first instant messaging application bound to a current virtual role identifier and an instant messaging application bound to the target virtual role identifier;

displaying a virtual role information interface on the virtual role interaction interface in response to a trigger operation on the target virtual role identifier, the virtual role information interface comprising a first instant session message triggering control and a user information query operation entry;

displaying a message input interface in response to a first trigger operation on the instant session message triggering control;

displaying a user information interface in response to a user information query operation triggered on the user information query operation entry, the user information interface comprising user information of a target instant messaging user account corresponding to the target virtual role identifier and a second instant session message triggering control;

displaying the message input interface in response to a second trigger operation on the second instant session message triggering control in the user information interface;

acquiring, in response to the instant messaging application bound to the target virtual role identifier being different from the first instant messaging application bound to the current virtual role identifier, a current instant messaging user account of a second instant messaging application corresponding to the first instant messaging application bound to the current virtual role identifier, the second instant messaging application being the same as the instant messaging application bound to the target virtual role identifier; and transmitting, after a session message is inputted in the message input interface, the session message used for displaying on the instant messaging application bound to the target virtual role identifier from the current instant messaging user account to the target instant messaging user account corresponding to the target virtual role identifier.

18. The non-transitory computer-readable storage medium of claim 17, wherein the one or more processors are caused to transmit the session message used for displaying on the instant messaging application to the target instant messaging user account corresponding to the target virtual role identifier by:

transmitting, through a communication channel of the instant messaging application, the session message used for displaying in the instant messaging application to the target instant messaging user account corresponding to the target virtual role identifier.

19. The non-transitory computer-readable storage medium of claim 17, wherein the one or more processors are caused to display the instant session message triggering control on the virtual role interaction interface in response to the trigger operation on the target virtual role identifier by:

displaying, in the virtual role interaction interface in response to the trigger operation on the target virtual role identifier, a virtual role information interface corresponding to the target virtual role identifier;

displaying a user information interface in response to a user information query operation triggered on the virtual role information interface; and displaying, on the user information interface, user information of the target instant messaging user account corresponding to the target virtual role identifier, and displaying an instant session message triggering control.

* * * * *